(12) United States Patent
Mas et al.

(10) Patent No.: US 7,884,157 B2
(45) Date of Patent: Feb. 8, 2011

(54) PROCESS FOR PREPARING COPOLYMERS BY ANIONIC SOLVENT-FREE POLYMERIZATION

(75) Inventors: André Mas, Saint Gely du Fesc (FR); Nadia Guerrouani, Montpellier (FR); François Schue, Montpellier (FR)

(73) Assignees: Centre National de la Recherche Scientifique, Paris (FR); Universite Montpellier 2 Sciences et Techniques, Montpellier (FR)

( * ) Notice: Subject to any disclaimer, the term of this patent is extended or adjusted under 35 U.S.C. 154(b) by 0 days.

(21) Appl. No.: 12/095,248

(22) PCT Filed: Nov. 28, 2006

(86) PCT No.: PCT/FR2006/002603

§ 371 (c)(1),
(2), (4) Date: Aug. 28, 2008

(87) PCT Pub. No.: WO2007/060344

PCT Pub. Date: May 31, 2007

(65) Prior Publication Data

US 2008/0312376 A1 Dec. 18, 2008

(30) Foreign Application Priority Data

Nov. 28, 2005  (FR) .................................. 05 12001

(51) Int. Cl.
*C08L 29/04* (2006.01)
*C08L 67/00* (2006.01)

(52) U.S. Cl. .............................. 525/58; 525/56; 525/61; 525/415; 528/354; 528/357; 528/358; 528/413

(58) Field of Classification Search .................... 525/56, 525/58, 415, 61; 526/123.1, 89, 221, 235; 528/354, 357, 358, 412, 413
See application file for complete search history.

(56) References Cited

U.S. PATENT DOCUMENTS

| 6,201,072 B1 | 3/2001 | Rathi et al. |
| 6,350,812 B1 | 2/2002 | Vert et al. |
| 6,590,043 B1 * | 7/2003 | Nagasaki et al. ............ 525/404 |
| 6,943,211 B1 | 9/2005 | Hubbell et al. |

FOREIGN PATENT DOCUMENTS

| WO | WO 9719973 | 6/1997 |
| WO | WO 2006007402 | 1/2006 |

OTHER PUBLICATIONS

Rashkov, I. et al., "Synthesis, characterization, and hydrolytic degradation of PLA/PEO/PLA triblock copolymers with short poly(L-lactic acid) chains", Macromolecules, 1996, pp. 50-56, XP002390011.
French search report in corresponding FR 0512001.
International search report in corresponding PCT/FR2006/002603.

* cited by examiner

*Primary Examiner*—David Wu
*Assistant Examiner*—Marie Reddick
(74) *Attorney, Agent, or Firm*—Young & Thompson

(57) ABSTRACT

The invention concerns a process for preparing a block or comb copolymer comprising at least one hydrophilic portion and at least two hydrophobic portions, by anionic solvent-free polymerization of a prepolymer selected from a polyethylene glycol and a polyvinyl alcohol, and of a lactone or dilactone monomer. The process is carried out in the presence of an alkaline-earth metal hydride, in an inert atmosphere, and the polymerization step is not carried out under vacuum. The invention also concerns copolymers obtained by this process.

6 Claims, 27 Drawing Sheets

Fig. 24a
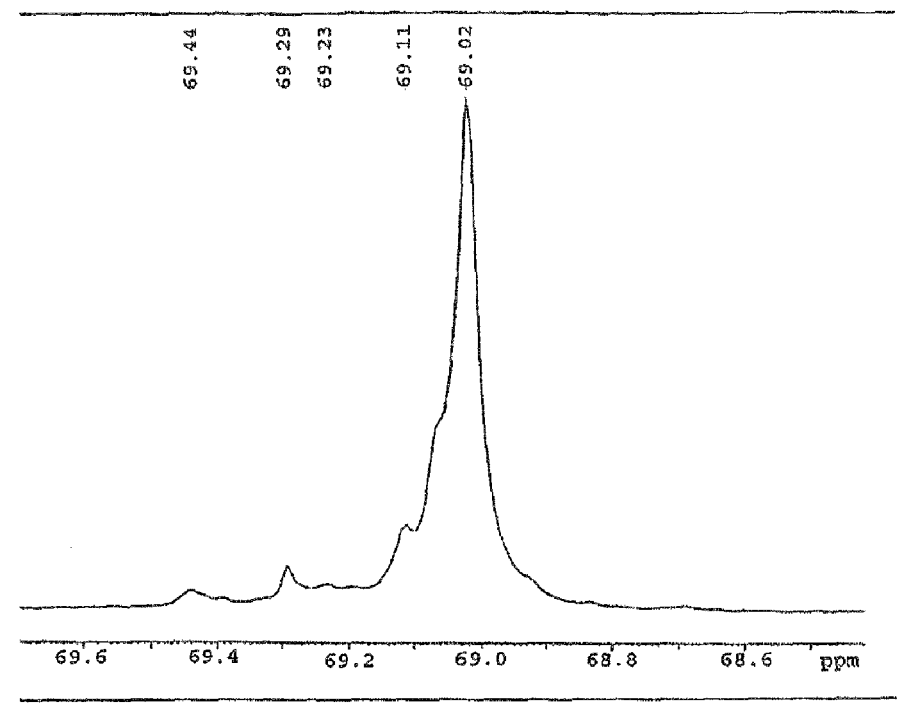
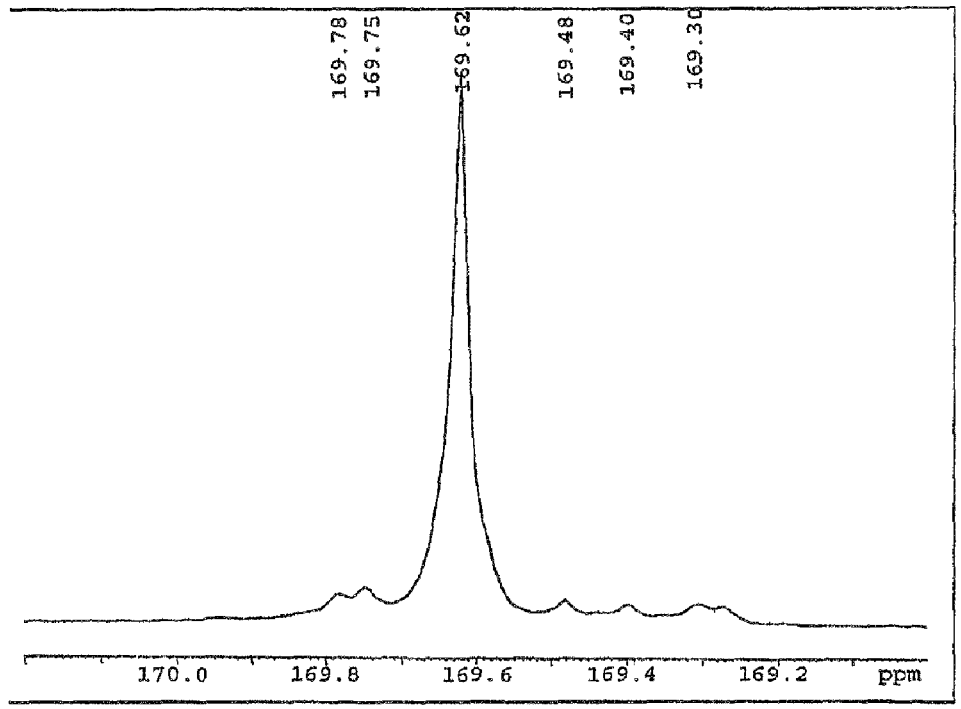
Fig. 24b

Fig. 34a
a) PVA:
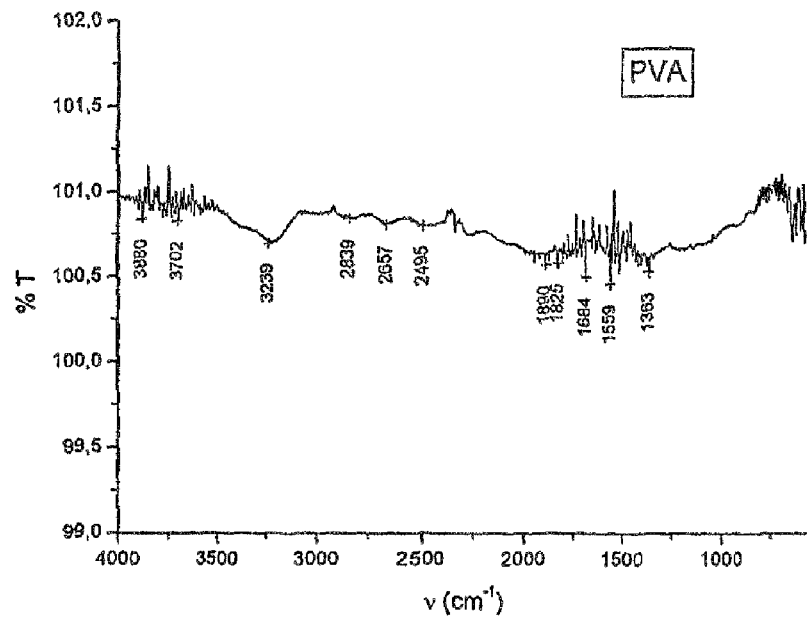
b) PVA 14h:
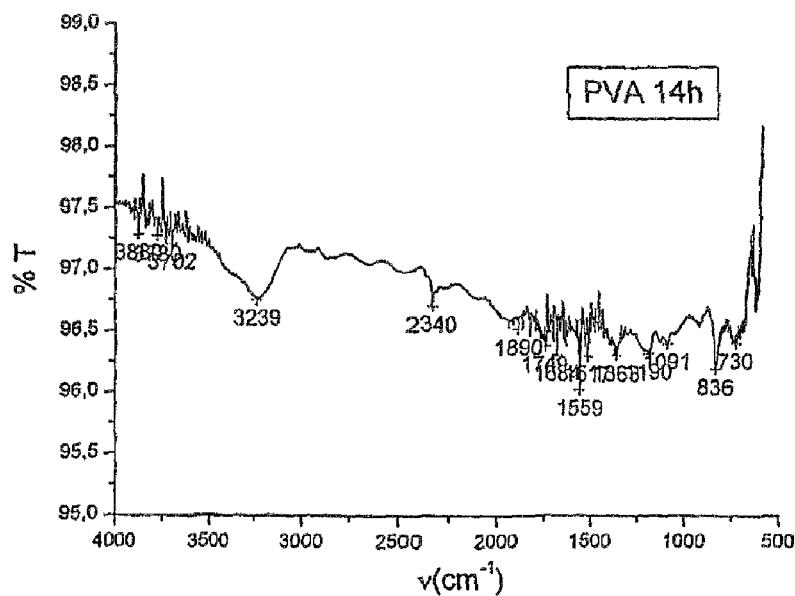
Fig. 34b a) PVA 4j :

b) Différence PVA 4j – PVA :

PROCESS FOR PREPARING COPOLYMERS BY ANIONIC SOLVENT-FREE POLYMERIZATION

BACKGROUND OF THE INVENTION

1. Field of the Invention

The present invention relates to a process for preparing a block or comb copolymer comprising at least one hydrophilic portion and at least two hydrophobic portions, as well as to copolymers obtained by this process.

The aim of the process of the invention is preparing block or comb copolymers comprising hydrophilic segments carrying hydroxyl groups, and polylactone type hydrophobic segments. Such copolymers are known to be biodegradable and non toxic copolymers which are capable of forming micelles in the aqueous phase.

2. Description of the Related Art

International patent application WO-A-97/19973 and Rashkov et al (Macromolecules 1996, 29, pp 50-56) describe the solvent-free copolymerization of polyethylene glycol and lactone. The process comprises steps consisting of degassing the reaction mixture (placed in a flask) under vacuum, heating it in an atmosphere of argon to 140° C. until the mixture is in the liquid form, then placing it under a vacuum of $10^{-2}$ mm/Hg and sealing the flask then keeping it in an oven at 140° C. for 7 days. The reaction is carried out in the presence of calcium hydride acting as a catalyst. However, in that process, a high performance degassing apparatus is needed in order to be able to operate under a partial vacuum. Installing and operating such an apparatus complicates the synthesis process in the laboratory (Schlenk apparatus, sealing, sealed tubes, vacuum pumps, etc), but far more so on an industrial scale for greater production. Such apparatus is costly and constitutes an obstacle to operating such a process on the industrial scale.

SUMMARY OF THE INVENTION

The present invention aims to provide a simpler and cheaper process for preparing block or comb copolymers comprising hydrophilic segments and hydrophobic segments.

In a first aspect, the invention provides a process for preparing a block or comb copolymer comprising at least one hydrophilic portion and at least two hydrophobic portions, by anionic solvent-free polymerization of a prepolymer selected from a polyethylene glycol and a polyvinyl alcohol, and of a lactone or dilactone monomer, in the presence of an alkaline-earth metal hydride, said process being carried out in an inert atmosphere, the polymerization step not being carried out under vacuum.

Bringing a prepolymer into contact with a hydride causes the formation of an alcoholate which then acts as a primer on the carbonyl group of the lactone or the dilactone with the formation of a polyalkanoate-b-polymer-b-polyalkanoate triblock copolymer or of a comb copolymer with a principal chain onto which several polylactone chains are grafted, depending on the nature of the prepolymer.

In the process of the invention, the polymerization step is thus not carried out under vacuum, as in the prior art processes cited above, but in an inert atmosphere. These operating conditions allow it to be used on an industrial scale as it is not necessary to use a complex apparatus for forming a partial vacuum during the polymerization procedure.

Further, compared with the cited prior art, the process of the invention enjoys the advantage of being capable of being carried out under improved operating conditions. In particular, these conditions comprise a reduction of the order of 20° C. to 30° C. in the polymerization temperature, a reaction time which is substantially identical for the synthesis of copolymers with a low molar mass (molar mass in the range from about 2500 to 4000) and a reaction time which is substantially reduced for the synthesis of copolymers with high molar masses (molar mass in the range 4000 to 70000) to obtain copolymers which are identical in terms of the structure of the concatenation and the molar mass to those obtained using the more complex prior art processes.

Another advantage of the process of the invention is that a biocompatible and cheap initiation system is used, it is carried out in the absence of any solvent, which prevents the formation of toxic residues, and it allows the direct use of copolymers obtained without particular purification, since all of the components present in the final medium are biocompatible.

BRIEF DESCRIPTION OF THE DRAWING FIGURES

FIGS. 17, 18*a*, 18*b*, 18*c*, 19*a*, 19*b*, 19*c*, 20*a*, 20*b*, 20*c*, 21*a*, 21*b*, 21*c*, 22*a*, 22*b*, 23, 24*a*, 24*b*, 25*a*, 25*b*, 26*a* and 26*b* are the spectra obtained during the process carried out in the conditions of Table V of Example 11.

FIGS. 27*a* and 27*b*, 28*a* and 28*b*, 29*a* and 29*b*, 30*a* and 30*b* are thermograms of the copolymers of Table VII of Example 12.

FIGS. 31*a*, 31*b*, 32*a*, 32*b* and 32*c* are thermograms of copolymers obtained according to the conditions of Table VIII of Example 12.

Figure 33:
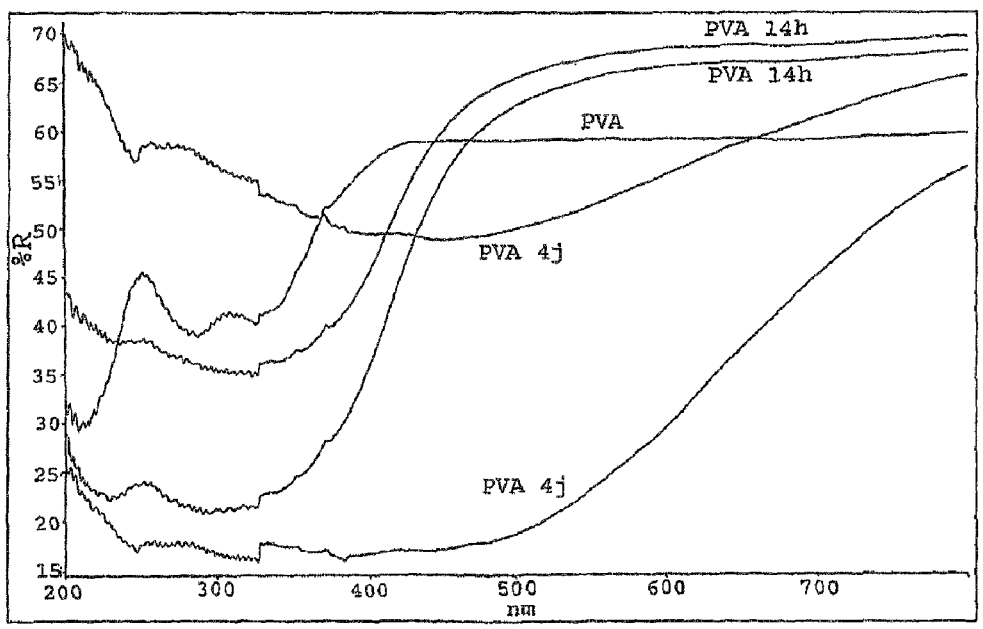

FIG. 33 is the UV-vis spectrophotometry of powders of polymers of Table VIII of Example 12.

FIGS. 34a and 34b and FIGS. 35a and 35b are IR of powders of PVA of Table VIII of Example 12.

DETAILED DESCRIPTION OF THE INVENTION

In accordance with a preferred embodiment, the hydride is selected from calcium hydride $CaH_2$ and magnesium hydride $MgH_2$.

The mean molar mass of the prepolymer may be selected from within a wide range. As an example, a PEG prepolymer may be used with a molar mass between 600 and 10000, or a PVA prepolymer may be used with a mean molar mass of between 15000 and 190000.

The lactone monomer may be selected from L-lactide (LLA), glycolide (GA), β-butyrolactone (BL), δ-valerolactone (VL) and ε-caprolactone (CL).

The inert atmosphere in the reactor is advantageously an argon atmosphere. The reaction may also be carried out in an atmosphere of nitrogen.

The choice and proportions of the starting products, namely the monomer, the prepolymer and the hydride, determines the composition of the final copolymer as well as the nature and number of repeating units, i.e. the length of the hydrophobic blocks and the length of the hydrophilic block when it is a triblock copolymer, and the length of the hydrophilic segment and the number and length of the hydrophobic segments grafted onto said hydrophilic segment when it is a comb copolymer. These respective lengths determine the equilibrium between the hydrophilic nature and the hydrophobic nature of the copolymer obtained.

The degree of polymerization, DP, depends on the quantity of monomer units t(mon) and the quantity of hydride T(hyd), by the relationship:

$$DP = t(mon)/2 \times T(hyd).$$

The degree of substitution of the groups, DS, depends on T(hyd) and the quantity of monomer units of the prepolymer T(prep), by the relationship:

$$DS = 2 \times T(hyd)/T(prep).$$

The molar yield depends on the lactone/prepolymer molar ratio and various other factors such as the degree of solubility of the lactone in the prepolymer, for example. As an example, to obtain a molar yield between 50% and 80%, it is preferable to use the following ratios:

for a PVA-g-PLLA copolymer: LLA/PVA of between 3 and 60;

for a ε-CL/PVA copolymer: ε-CL/PVA of more than 1.5.

Determination of suitable ratios for the other copolymers is within the purview of the skilled person.

It should be noted that during preparation of block or comb copolymers using a lactone or dilactone monomer (compounds which have an asymmetric carbon), the process of the present invention can produce copolymers comprising concatenations which are stereoregular and which have the same configuration as the lactone or dilactone monomer used, which means that polymerization is carried out without isomerization. It should be noted that the prior art process cited above produces an isomerized copolymer (cf Rashkov et al, Macromolecules, 196, 29, pp 57-62). Detailed examples showing the stereoregularity of the copolymers obtained in accordance with the present invention are presented below.

When the prepolymer is a polyethylene glycol, polymerization may be carried out at a temperature of 115° C. to 125° C. for a period of 14 to 16 hours. A reduction in the temperature implies an increase in duration, for example 70° C. for 48 hours.

When the prepolymer is a polyvinyl alcohol, polymerization is, for example, carried out at a temperature of 140° C. to 150° C. for a period of 36 to 54 hours. A shorter period at this temperature cannot result in a complete reaction and the yield is lower.

The inventors have also established that, although the melting point of a polyvinyl alcohol (PVA) is very close to its degradation temperature (about 160° C.-180° C.), the solvent-free reaction of a polyvinyl alcohol with a lactone (which means that the PVA is in the molten state) occurs substantially without degradation when the process of the invention is carried out. They conclude therefrom that the mixture of lactone or dilactone and alkaline-earth metal hydride acts as a plasticizer for the PVA and thus reduces its melting point, moving it well below its degradation temperature. Comparative examples demonstrating the near absence of degradation of copolymers based on PVA obtained by the process of the invention compared with the same copolymers obtained under the operating conditions described in the prior art (Rashkov et al, Macromolecules, 196, 29, pp 57-62) are presented below.

In a second aspect, the invention pertains to copolymers obtained by the process of the invention.

They are block copolymers or comb copolymers.

A block copolymer comprises a PEG block between two polylactone blocks. The recurrent units in the polylactone blocks are derived from a monomer selected, for example, from L-lactide, glycolide, β-butyrolactone, δ-valerolactone and ε-caprolactone. The block copolymers correspond to the following formulae, for example, in which m represents the number of recurrent ethylene oxide units in the initial PEG, and n represents the number of recurrent lactone units.

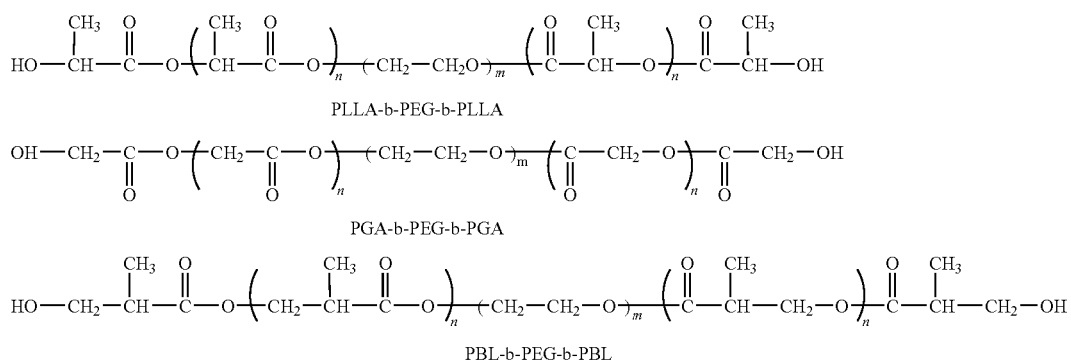

PLLA-b-PEG-b-PLLA

PGA-b-PEG-b-PGA

PBL-b-PEG-b-PBL

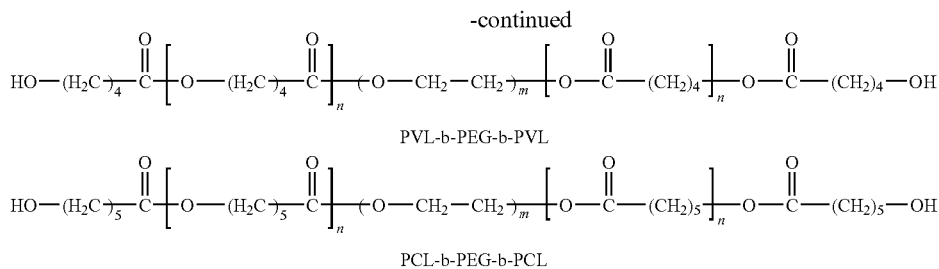

PVL-b-PEG-b-PVL

PCL-b-PEG-b-PCL

The comb copolymers comprise recurrent —CH$_2$—CH(OH)— units and recurrent —CH$_2$—CH(OR)— units in which R represents a polylactone chain. The polylactone chain is, for example, derived from a monomer selected from L-lactide, glycolide, β-butyrolactone, δ-valerolactone and ε-caprolactone. The copolymers correspond, for example, to the following formula in which m corresponds to the number of recurrent PVA units which have not been modified, n represents the number of recurrent units onto which a polylactone chain has been grafted, and p represents the number of units derived from lactone.

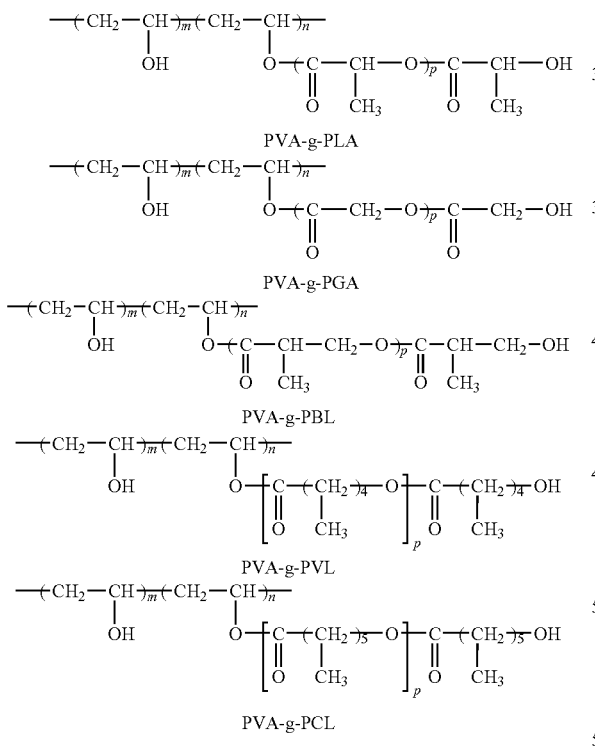

In the following formulae:
PEG designates the polyethylene glycol block;
PLA designates the polylactide block;
PCL designates the polycaprolactone block;
PBL designates the polybutyrolactone block;
PGA designates the polyglycolide or polyglycolic acid block;
PVL designates the polyvalerolactone block; and
PVA designates the polyvinyl alcohol block.

The present invention is illustrated below by specific examples, although they are not limiting in nature. These examples describe in detail the synthesis and characterization of various copolymers.

The techniques employed for characterization of the copolymers were proton nuclear magnetic resonance ($^1$H-NMR) and carbon nuclear magnetic resonance ($^{13}$C-NMR), gel permeation chromatography (GPC), differential scanning calorimetry (DSC) and IR analysis.

$^1$H-NMR can determine the structure of the copolymers obtained as well as their number average molar mass (Mn).

$^1$H-NMR spectra of block copolymers have a characteristic PEG signal at 3.5 ppm. The presence of lactone units is demonstrated by signals, in the form of broad peaks, for the methyl group in the case of lactide and butyrolactone as well as by the relative signals of the —CH$_2$)n— group in the case of caprolactone units.

For block copolymers containing PEG, the relationship below allows the ratio of the monomer units, MO/EO, to be deduced, where MO designates the lactone unit, EO designating the ethylene oxide unit. The number average molar mass of the copolymer may be calculated from the MO/EO ratio using the following relationship in which I represents integration of the proton peak of the $^1$H-NMR spectrum:

$$MO/EO = (\text{no of protons of lactone at a given signal}) \times I_{lactone\ at\ this\ signal}/I_{PEG}(3.5)$$

$$Mn(NMR) = M_{PEG} + M_{lactone} = M_{PEG} + (\text{mass of lactone} \times M_{PEG}/44 \times MO/EO)$$

$M_{PEG}$ represents the number average molar mass of the PEG used for synthesis of the copolymer.

For comb copolymers containing PVA, the $^1$H-NMR spectrum can highlight the ester bonds between the hydrophilic and hydrophobic blocks, determine the percentage of grafting by the presence of PVA signals in the spectra, and deduce the degree of substitution DS of the OH groups of the PVA, using the following formula:

$$DS = 2I_{x'}/I_{1-1.7} - 3(I_a + I_{a'})$$

In which $I_{x'}$ is the intensity of the peak corresponding to grafted CH—O, $I_{1-1.7}$ is the intensity of the grafted and not grafted CH$_2$ groups of the PVA and the CH$_3$ groups of the PLA chains, and $I_a + I_{a'}$ is the intensity of the CH(CH$_3$) groups of the PLA chains.

$^{13}$C-NMR allowed the configuration of the asymmetric carbons of the concatenation to be determined.

GPC was carried out in chloroform at a flow rate of 1 ml/s. The chromatograms of the synthesized copolymers exhibited a single distribution curve and produced values for Mn, Mw and $I_p$ determined with respect to a polystyrene standard.

DSC allowed the glass transition temperature (Tg), the melting point (Tf) and the crystallization temperature (Tc) of the copolymers to be determined, as well as the enthalpies of fusion and the variations in the heat capacity of the polymers.

For comb copolymers comprising PVA, the IR study could identify the characteristic functions, i.e. the ester functions and the alcohol functions certain of which were bound and others are free.

EXAMPLE 1

Preparation of a PLLA-PEG-PLLA Copolymer

Preparation of Copolymer 0.069 mmol of pure PEG 2000 (PEG with an Mn of 2000), 6.9 mmol of L-lactide monomer and 0.069 mmol of $MgH_2$ were introduced into a flask which had been oven dried at 110° C. for 2 b and kept under an argon atmosphere; all of the reagents had been completely dehydrated. The reaction mixture was kept at 120° C. for 16 hours.

A PLLA-PEG-PLLA copolymer was obtained in a yield of 70% and with a degree of L-lactide conversion of close to 100%. The fact that the yield was lower than the degree of conversion can be explained by the loss of copolymer during purification and by the greater solubility of the fractions with a low molar mass in the precipitation solvent used.

Characterization of Copolymer

Figure 1:
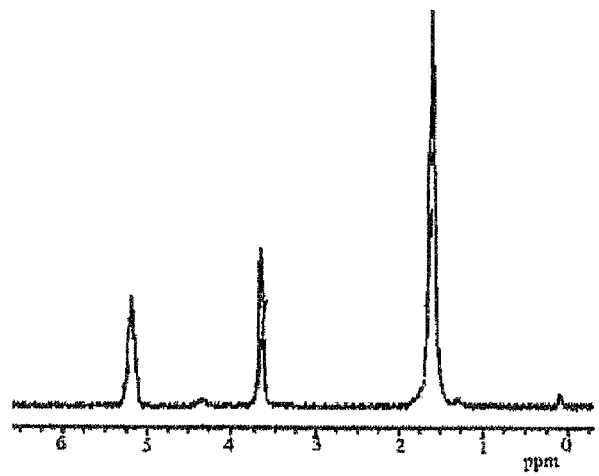
FIG. 1 is an 1H-NMR spectrum of a PLLA-PEG-PLLA copolymer prepared according to the invention process.

FIG. 1 shows the $^1$H-NMR spectrum of the copolymer. The molar mass Mn, calculated using the formula given above, was Mn=13800.

Figure 2:
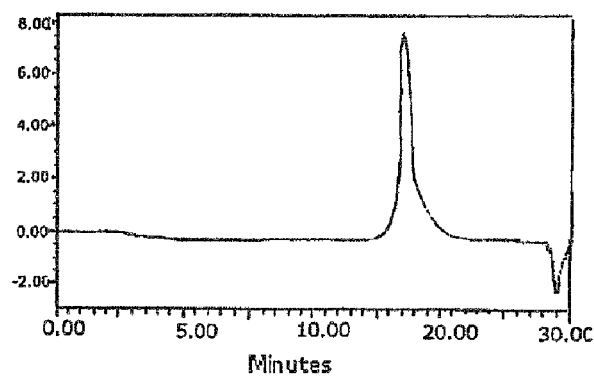
FIG. 2 is a GPC chromatogram of the PLLA-PEG-PLLA copolymer.

FIG. 2 shows the GPC chromatogram of the copolymer. The following values were deduced therefrom: Mn=12500; Mw=15000; Ip=1.2. The molar mass determined by NMR and GPC and the calculated molar mass were in good agreement. The polymolecularity index was low.

Figure 3:
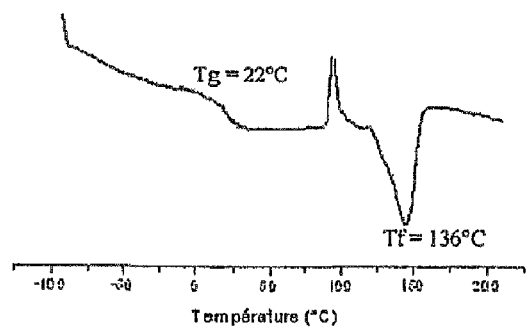
FIG. 3 is the thermogram of the PLLA-PEG-PLLA copolymer.

FIG. 3 shows the thermogram obtained by DSC. It shows that the copolymer had a Tg of 22° C., between that of PEG (−50° C.) and that of PLLA (50° C.), and a melting point Tf of 136° C.; it also was between the melting point of PEG (60° C. and that of PLLA (140° C.).

Figure 4:
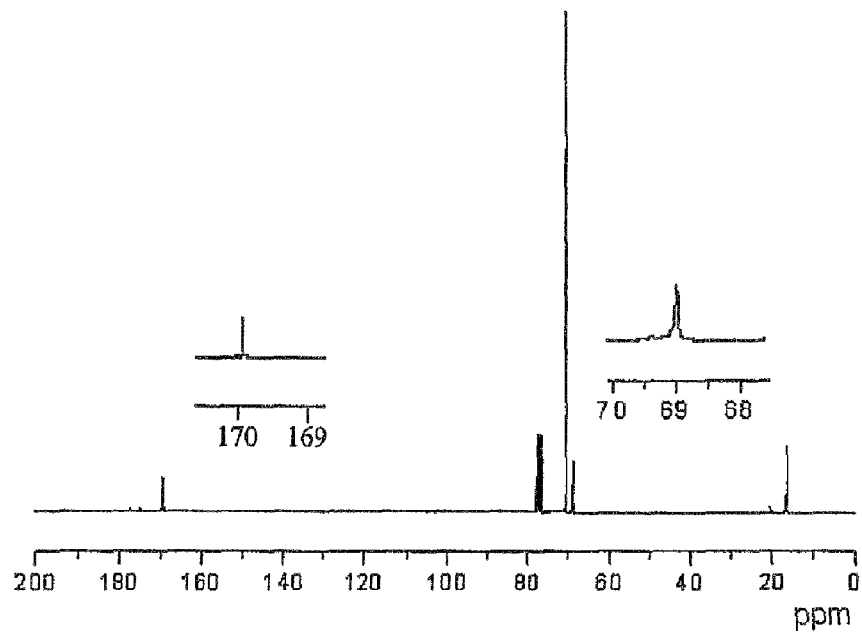
FIG. 4 is an 13C-NMR spectrum of the PLLA-PEG-PLLA copolymer.
Figure 5:
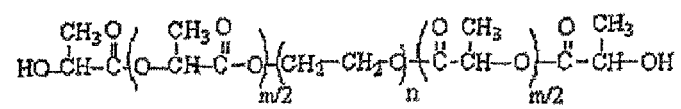
FIG. 5 is the 13C-NMR spectrum of a copolymer prepared according to the related art.
Figure 5:
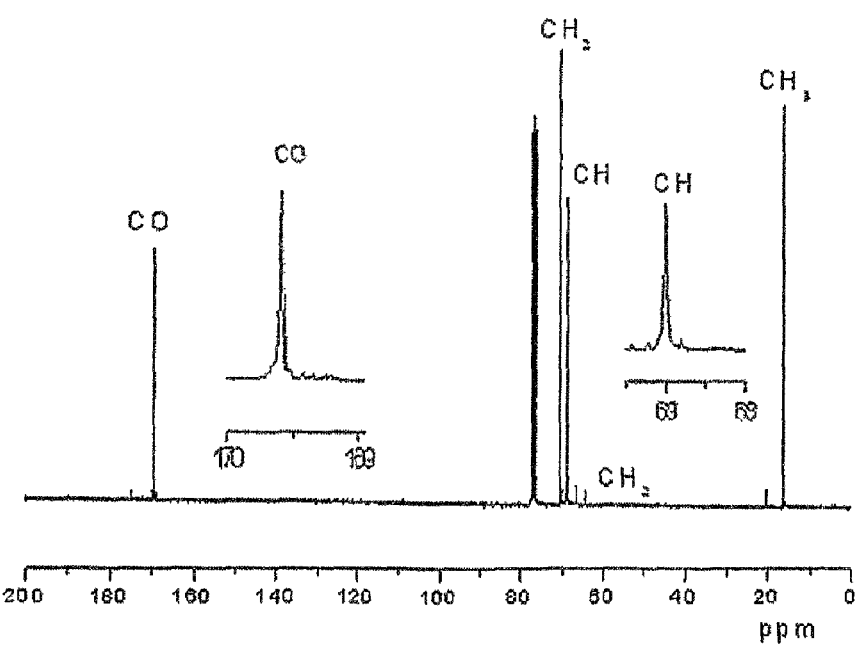

FIG. 4 shows the $^{13}$C-NMR spectrum of the copolymer of the present example, and FIG. 5 shows the $^{13}$C-NMR spectrum of a copolymer prepared in accordance with the prior art (see Rashkov, cited above) at a temperature of 140° C. for 4 days. FIG. 4 shows the absence of isomerization, i.e. the absence of peaks relating to concatenations comprising lactide units with a D or D-L configuration, while in FIG. 5, these peaks with low intensities, located at 169.25 ppm to 169.5 ppm, attributed to CO, and at 69.04 ppm, attributed to CH, are visible.

EXAMPLE 2

Preparation of a PCL-PEG-PCL Copolymer

The operating procedure of Example 1 was repeated to prepare a PCL-PEG-PCL copolymer, using:

0.069 mmol of PEG 2000 (pure);

6.9 mmol of ε-caprolactone (pure);

0.069 mmol of $MgH_2$;

a temperature of 120° C. and a duration of 14 hours.

A PCL-PEG-PCL copolymer was thus obtained, in a yield of 90%.

Figure 6:
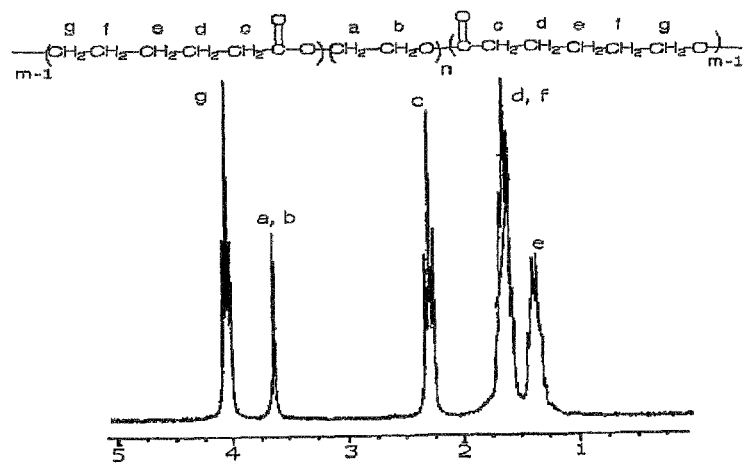
FIG. 6 is an 1H-NMR spectrum of a PCL-PEG-PCL copolymer prepared according to the present invention.

FIG. 6 shows the $^1$H-NMR spectrum of the copolymer. The molar mass Mn, calculated using the formula given above, was Mn=14500.

Figure 7:
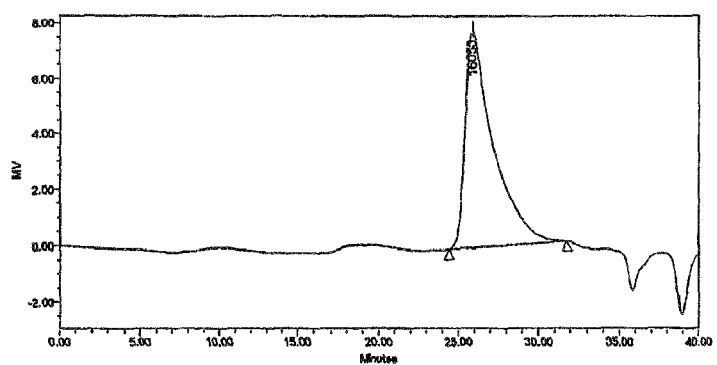
FIG. 7 is a GPC chromatogram of the PCL-PEG-PCL copolymer.

FIG. 7 shows the GPC chromatogram of the copolymer. The following values were deduced therefrom: Mn=15000, Mw=17800; Ip=1.18.

Figure 8:
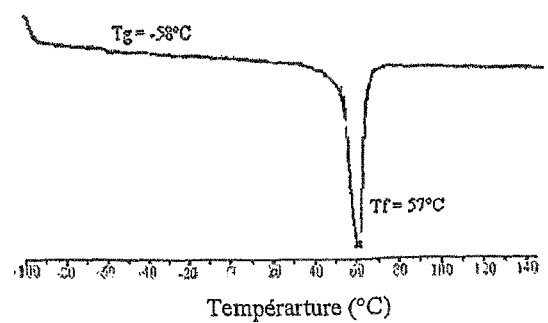
FIG. 8 is the thermogram the PCL-PEG-PCL copolymer.

FIG. 8 shows the thermogram obtained by differential scanning calorimetry. It shows that the copolymer had a Tg of −58° C. and a melting point Tf of 57° C.

EXAMPLE 3

Preparation of a PBL-PEG-PBL Copolymer

The operating procedure of Example 1 was repeated to prepare a PBL-PEG-PBL copolymer, using:

0.069 mmol of PEG 2000 (pure);

13.8 mmol of β-butyrolactone (pure);

0.069 mmol of $MgH_2$;

a temperature of 120° C. and a duration of 12 hours.

A copolymer was obtained in a yield of 54%.

Figure 9:
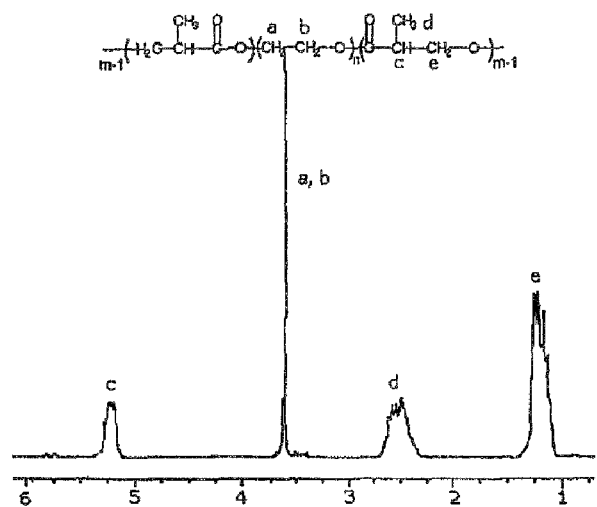
FIG. 9 is an 1H-NMR spectrum of a PBL-PEG-PBL copolymer prepared according to the present invention.

FIG. 9 shows the $^1$H-NMR spectrum of the copolymer. The molar mass Mn, calculated by the formula given above, was Mn=15200.

Figure 10:
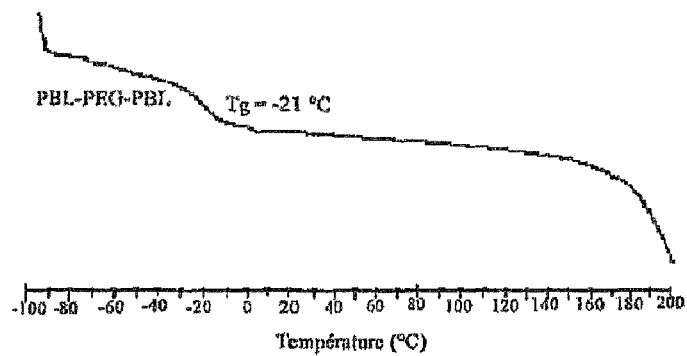
FIG. 10 is the thermogram the PBL-PEG-PBL copolymer prepared according to the present invention, obtained by differential scanning calorimetry.

FIG. 10 shows the thermogram obtained by differential scanning calorimetry. It shows that the copolymer had a Tg of −21° C., between the Tg of PEG (−50° C.) and that of PBL (15° C.).

Figure 11:
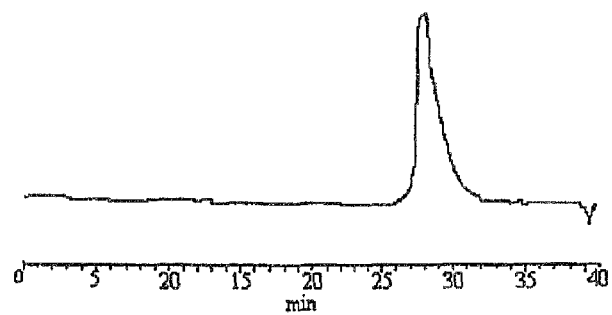
FIG. 11 is a GPC chromatogram of the PBL-PEG-PBL copolymer.

FIG. 11 shows the GPC chromatogram of the copolymer. The following values were
deduced therefrom: Mn=7000; Mw=9100; Ip=1.3.

EXAMPLE 4

Preparation of a PVA-g-PLLA Copolymer

A PVA-g-PLLA copolymer was prepared by mixing pure L-lactide, a PVA with a Mn of between 31000 and 51000 and $CaH_2$ in a flask placed in a glove box under dry argon.

The mixture was dehydrated by being placed under vacuum for two hours, then it was placed under an argon atmosphere and heated to 150° C. with stirring, and the temperature was maintained for 48 h.

The product obtained had the following formula:

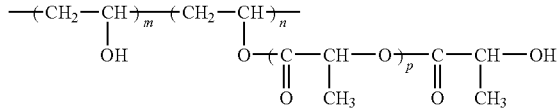

Several samples were prepared by varying the quantities of reagents and the reaction conditions. The results are shown in Table I below. The degree of polymerization, DP, and the degree of substitution, DS, were predetermined. The quantities of reagents were calculated with respect to the monomer unit as a function of the desired degree of polymerization and the number of grafted OH. As an example, for sample n° 1:

$DP=LLA/2\times CaH_2$, i.e. 13.88/2×0.65;

$DS=2\times CaH_2/PVA$, i.e. 2×0.65/10.5.

TABLE I

| | PVA (mmol) | LLA (mmol) | $CaH_2$ (mmol) | DP | DS | DSC Tg (° C.) | Molar yield, % |
|---|---|---|---|---|---|---|---|
| 1 | 10.5 | 13.88 | 0.65 | 10.6 | 12.5 | 40 | 5 |
| 2 | 5.25 | 13.88 | 0.33 | 21.0 | 12.5 | 41 | 67 |

TABLE I-continued

|   | PVA (mmol) | LLA (mmol) | CaH$_2$ (mmol) | DP | DS | DSC Tg °C. | Molar yield, % |
|---|---|---|---|---|---|---|---|
| 3 | 3.5 | 13.88 | 0.22 | 31.5 | 12.5 | 44 | 50 |
| 4 | 2.62 | 13.88 | 0.16 | 43.4 | 12.5 | 42 | 50 |
| 5 | 2.1 | 13.88 | 0.13 | 53.4 | 12.5 | 44 | 68 |
| 6 | 1.05 | 13.88 | 0.07 | 99.0 | 12.5 | 50 | 80 |
| 7 | 0.34 | 13.88 | 0.2 | 34.5 | 80 | 44 | 72 |
| 8 | 0.36 | 13.88 | 0.2 | 34.5 | 75 | 44 | 57 |
| 9 | 0.39 | 13.88 | 0.2 | 34.5 | 67 | 47 | 65 |
| 10 | 0.53 | 13.88 | 0.2 | 34.5 | 50 | 43 | 66 |
| 11 | 1.05 | 13.88 | 0.2 | 34.5 | 25 | 48 | 74 |
| 12 | 2.69 | 13.88 | 0.2 | 34.5 | 12.5 | 44 | 68 |
| 13 | 3.15 | 13.88 | 0.2 | 34.5 | 8 | 42 | 52 |
| 14 | 4.20 | 13.88 | 0.2 | 34.5 | 6 | 42 | 62 |
| 15 | 5.34 | 13.88 | 0.2 | 34.5 | 5 | 48 | 30 |
| 16 | 8.03 | 13.88 | 0.2 | 34.5 | 3.3 | 50 | 15 |
| 17 | 13.32 | 13.88 | 0.2 | 34.5 | 2 | 45 | 11 |

The results show that in all cases, grafting of the polylactone chains had taken place. The low yields of Examples 1, 16 and 17 were due to the high PVA/lactone reaction. To obtain a yield of between 50% and 80%, it is preferable to use a LLA/PVA ratio of between 3 and 60.

It should be noted that the value of Tg for the copolymer varied little as a function of the preparation conditions.

Figure 12:
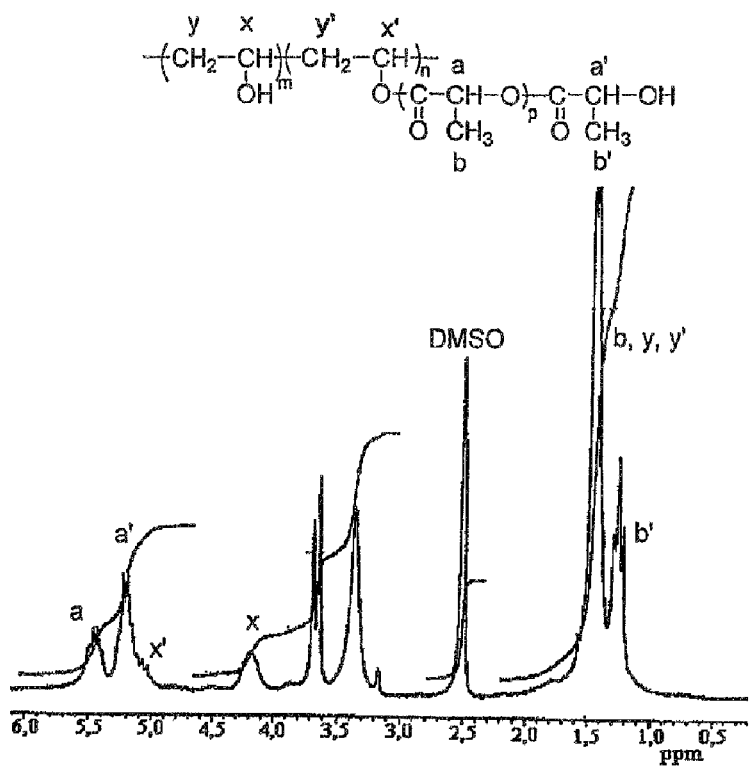
FIG. 12 is an 1H-NMR spectrum of the copolymer of sample 1 of Table I of Example 4.

FIG. 12 shows the $^1$H-NMR spectrum of sample 1 of Table I. All of the signals are present, but they are partially superimposed. Only the bond signal at 5.1 ppm remains identifiable for PVA. The degree of substitution DS can be deduced therefrom by the formula:

$$DS = 2I_{x'}/I_{1-1.7} - 3(I_a + I_{a'})$$

in which $I_{x'}$ is the intensity of the peak corresponding to grafted CH—O, $I_{1-1.7}$ is the intensity of 1 at 1.7 ppm, and $I_a + I_{a'}$ is the intensity of the CH(CH$_3$) groups of the PLA chains.

Figure 13:
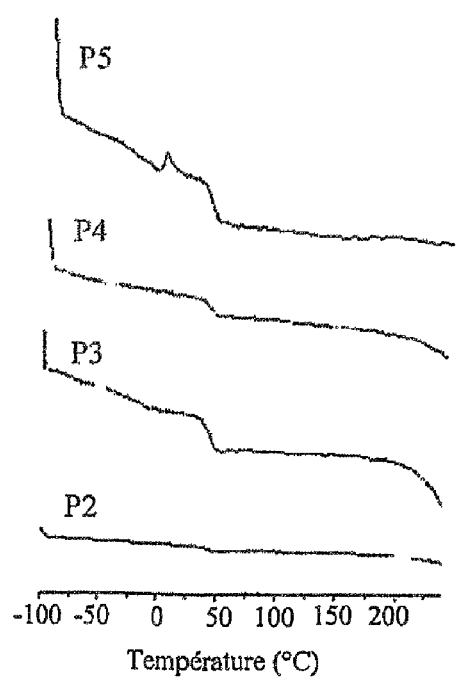
FIG. 13 is the thermogram of samples 2, 3, 4 and 5 of Table I of Example 4.

The thermograms obtained by DSC showed the presence of a single glass transition temperature which was closer to that of PLLA given the large quantity of lactone compared with PVA. FIG. 13 shows the thermograms of samples 2, 3, 4 and 5 of Table I.

Figure 14:
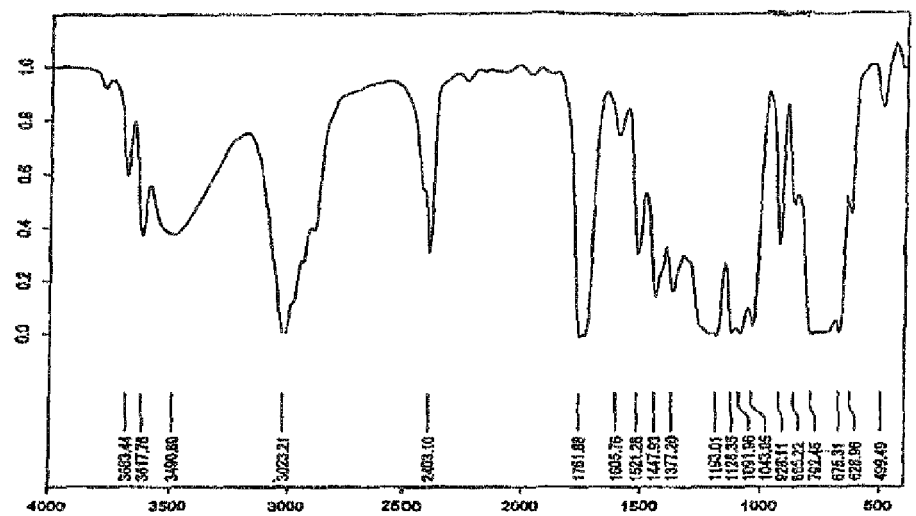
FIG. 14 is the IR spectrum of sample 3 of Table I of Example 4.

FIG. 14 shows the IR spectrum of sample 3 of Table I. It allowed the following characteristic functions of the copolymer to be determined:
 the ester functions at 1757 cm$^{-1}$;
 the alcohol functions at 3683, 3622 and 3455 cm$^{-1}$, some of which corresponded to —OH groups at the end of the PLLA chains and others of which to —OH groups of PVA which were not grafted;
 C—O bonds at 1216 and 1092 cm$^{-1}$.

EXAMPLE 5

Preparation of a PVA-g-PCL Copolymer

A PVA-g-PCL copolymer was prepared by mixing ε-caprolactone (εCL), a PVA with a Mn of between 31000 and 51000, and CaH$_2$ in a flask placed in a glove box under dry argon.

The mixture was dehydrated by being placed under vacuum for two hours, then it was placed under an argon atmosphere and heated to 180° C. for 20 min then at 150° C. with stirring; the total heating period was 48 h.

The product obtained had the following formula:

$$-\!\!\operatorname{\big(CH_2\!-\!CH\big)_{\!m}}\!\!-\!\!\operatorname{\big(CH_2\!-\!CH\big)_{\!n}}\!\!-$$
$$\quad\quad\;\;|\quad\quad\quad\quad\quad\;\;|$$
$$\quad\quad\;\;OH\quad\quad\quad\;\;O\!-\!\underset{\overset{\|}{O}}{C}\!\!-\!\!(CH_2\!-\!CH_2\!-\!CH_2\!-\!CH_2\!-\!CH_2)_{\!p}\!\!-\!OH$$

Several samples were prepared by varying the quantities of reagents and the reaction conditions. The results are shown in Table II below. The degree of polymerization, DP, and the degree of substitution, DS, were determined. The quantities of reagents were calculated with respect to the monomer unit as a function of the desired degree of polymerization and the number of grafted OH groups. As an example, for sample n° 1:

$DP = \epsilon CL/2 \times CaH_2$, i.e. 1.68/2×0.054;

$DS = 2 \times CaH_2/PVA$, i.e. 2×0.054×1.85.

TABLE II

|   | PVA (mmol) | εCL (mmol) | CaH$_2$ (mmol) | DP | DS | DSC Tg °C. | Tf °C. | Molar yield, % |
|---|---|---|---|---|---|---|---|---|
| 1 | 1.85 | 1.68 | 0.054 | 16 | 6 | −30 | — | 8 |
| 2 | 0.92 | 1.68 | 0.027 | 31 | 6 | −35 | — | 35 |
| 3 | 1.05 | 1.68 | 0.207 | 4 | 40 | −32 | — | 77 |
| 4 | 8.02 | 7.98 | 0.207 | 20 | 5 | −30 | — | 50 |
| 5 | 1.85 | 13.89 | 0.062 | 112 | 7 | −40 | 60 | 60 |
| 6 | 3.15 | 13.89 | 0.207 | 34 | 13 | −50 | 54 | 69 |
| 7 | 10.60 | 13.89 | 0.240 | 58 | 4.5 | −28 | — | 50 |

The results show that in all cases, grafting of polylactone chains had taken place. The low yield of Example 1 was due to the high PVA/lactone ratio. To obtain a yield of between 50% and 80%, it is preferable to use a εCL/PVA ratio of more than 1.5.

Figure 15:
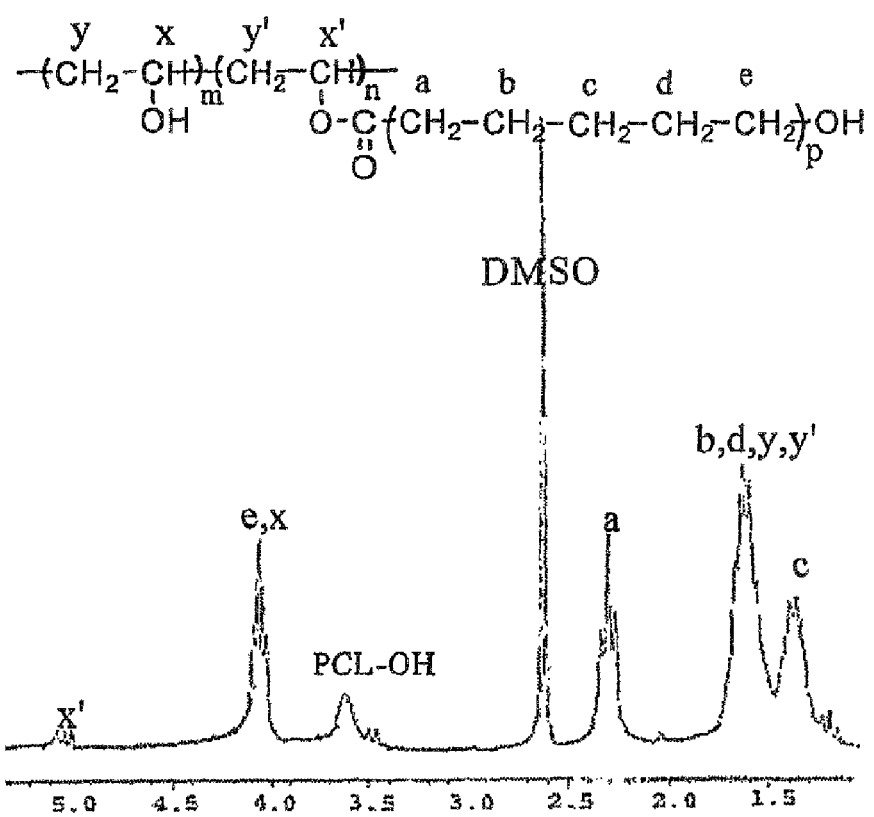
FIG. 15 is an 1H-NMR spectrum of a PVA-g-PCL copolymer of Example 5.

FIG. 15 shows the $^1$H-NMR spectrum. Since the quantity of εCL was higher than that of PVA, the signals corresponding to PVA were difficult to identify using $^1$H-NMR. The spectrum showed a faint signal at 5.2 ppm which correlated to the bonded CH of PVA in the PVA-g-PCL copolymer.

Figure 16:
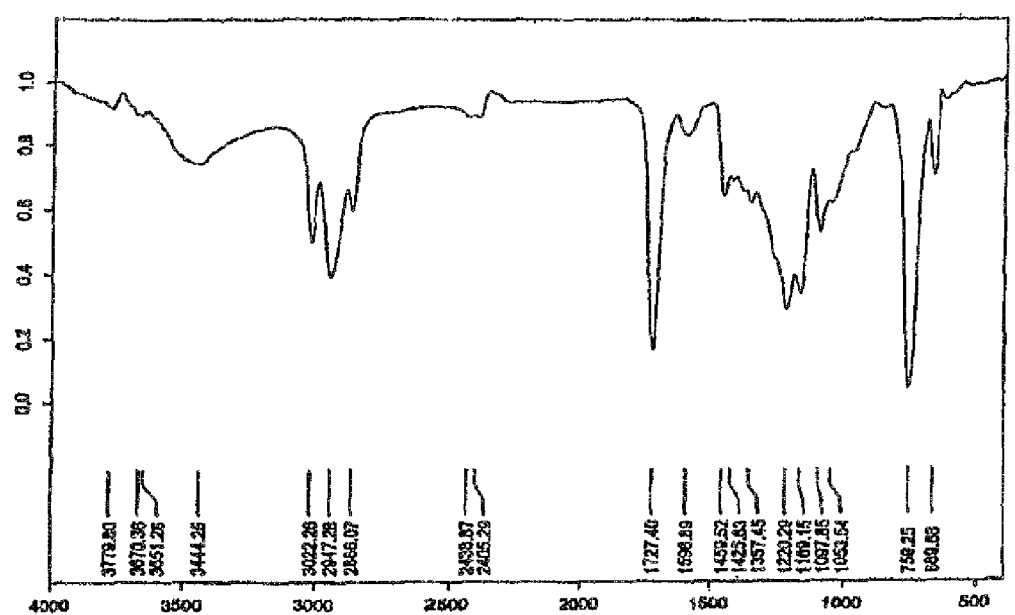
FIG. 16 is the IR spectrum of the copolymer obtained in Example 5.
Figure 17:
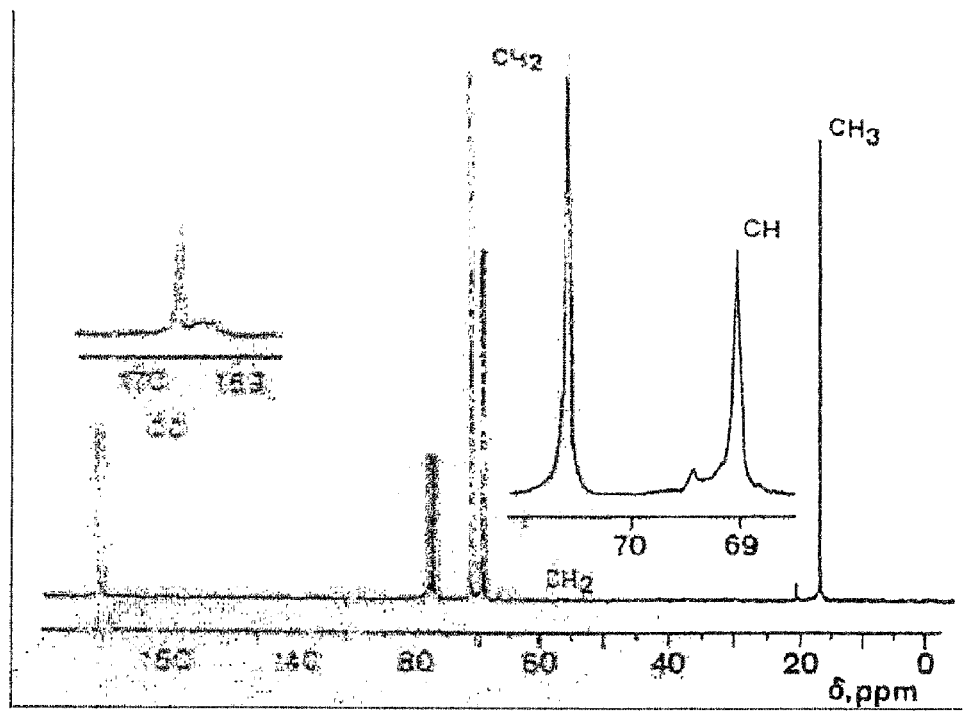
Figure 18A:
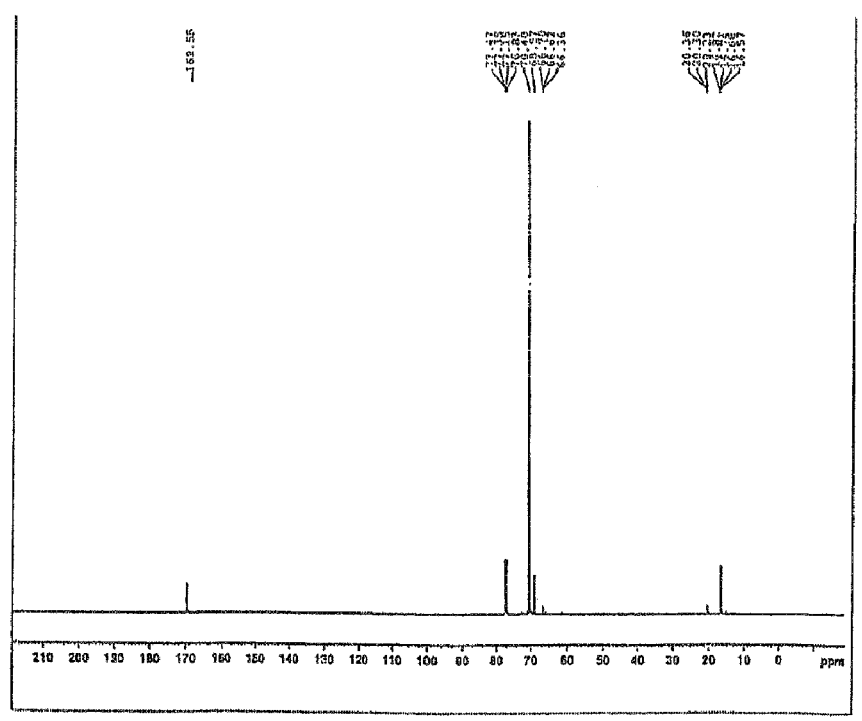
Figure 18B:
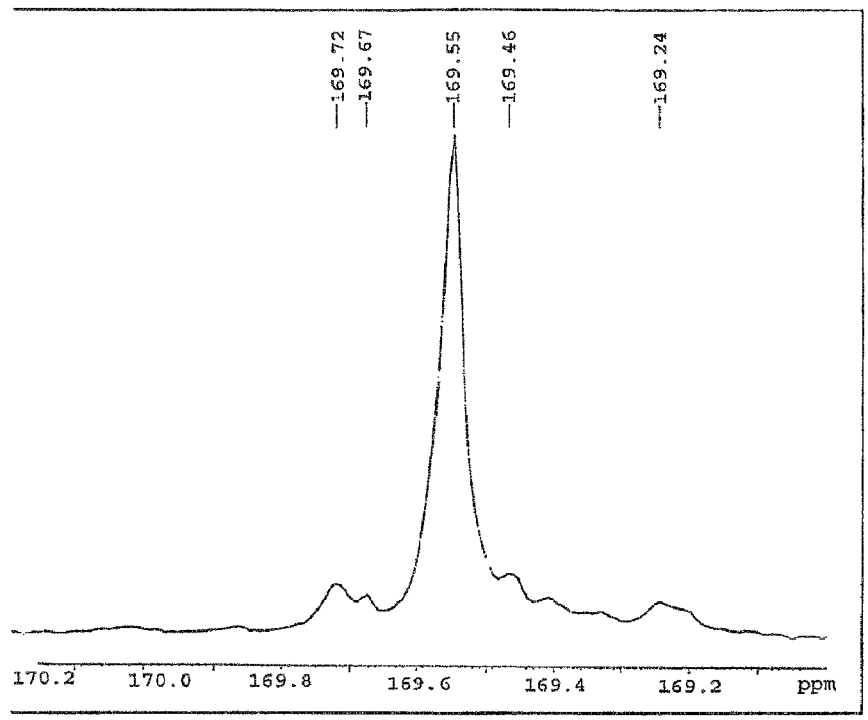
Figure 18C:
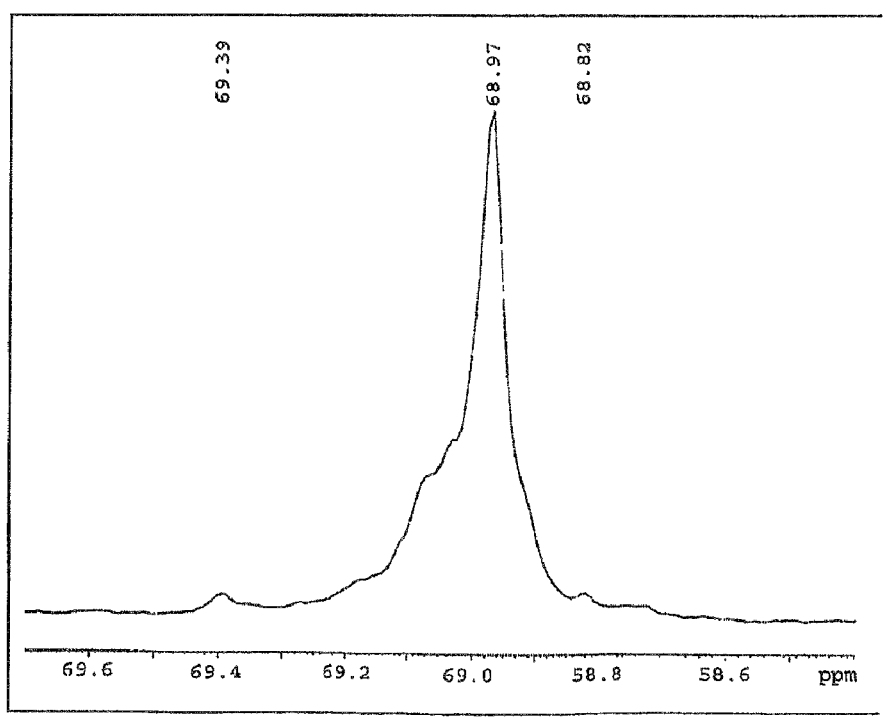
Figure 19A:
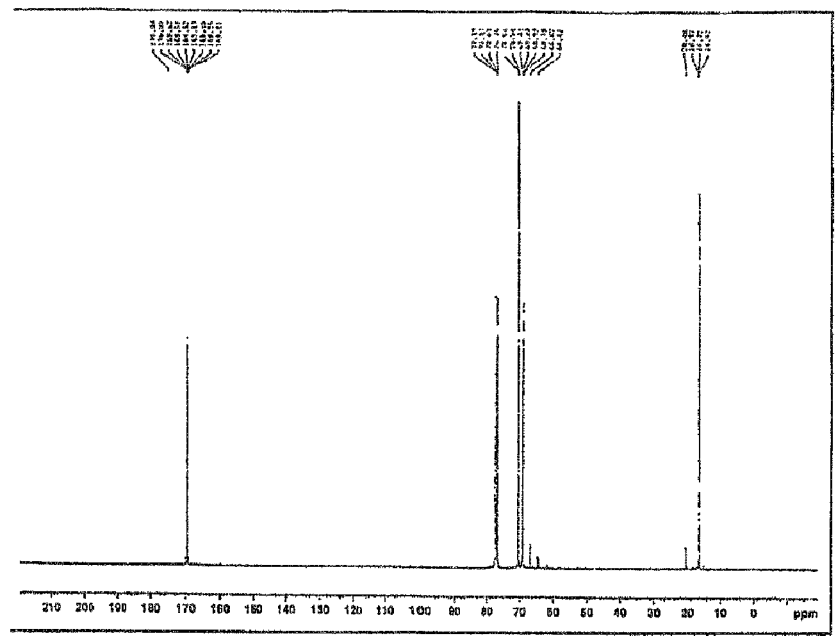
Figure 19B:
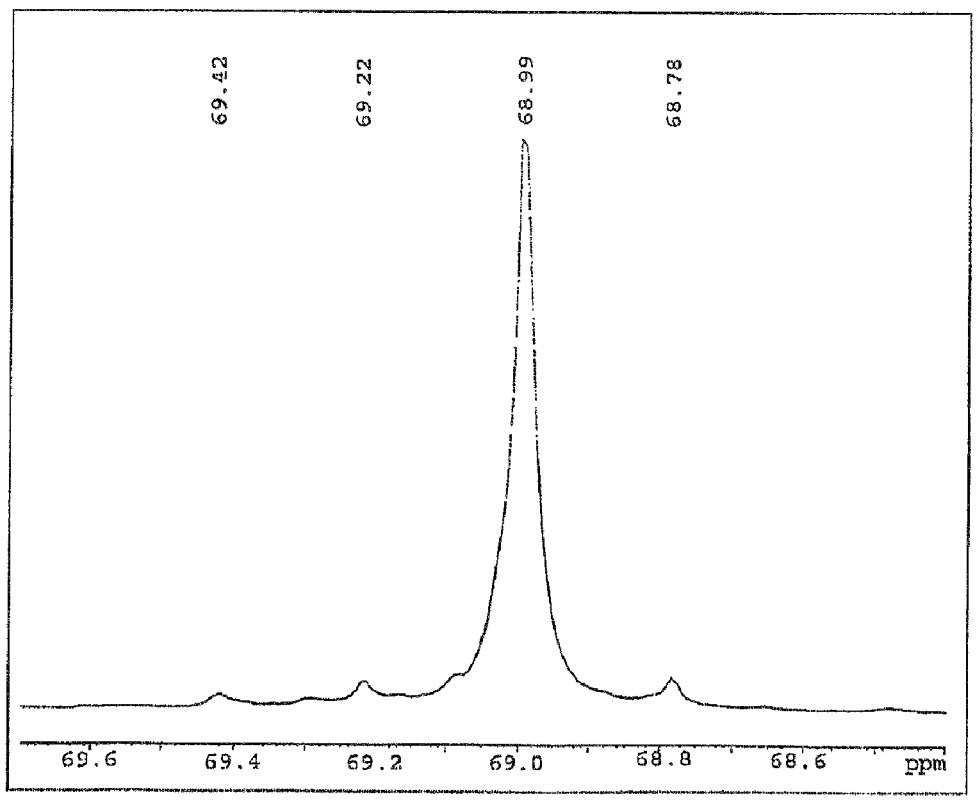
Figure 19C:
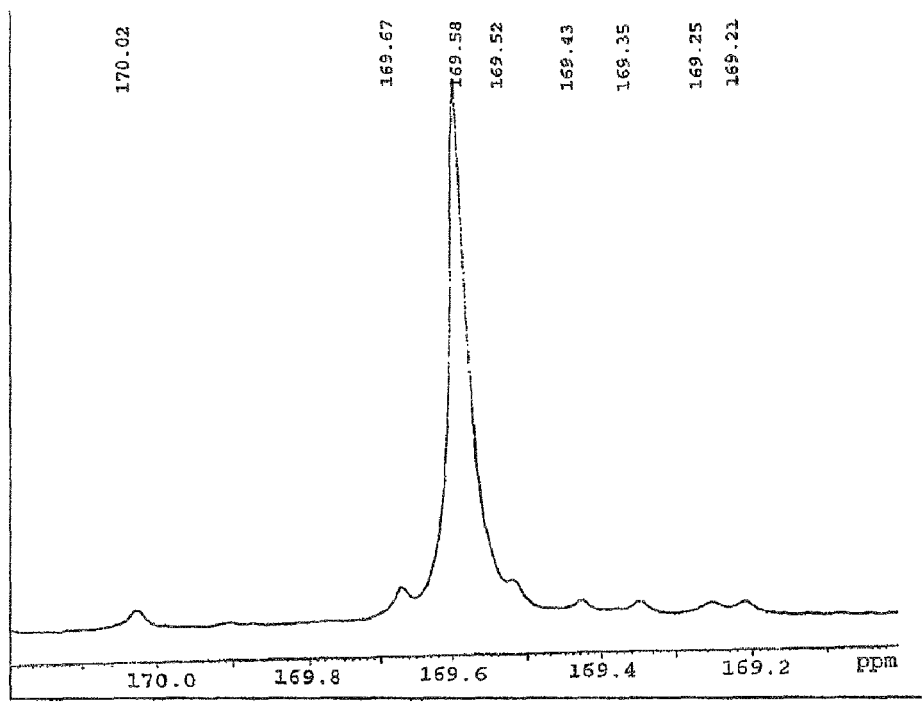
Figure 20A:
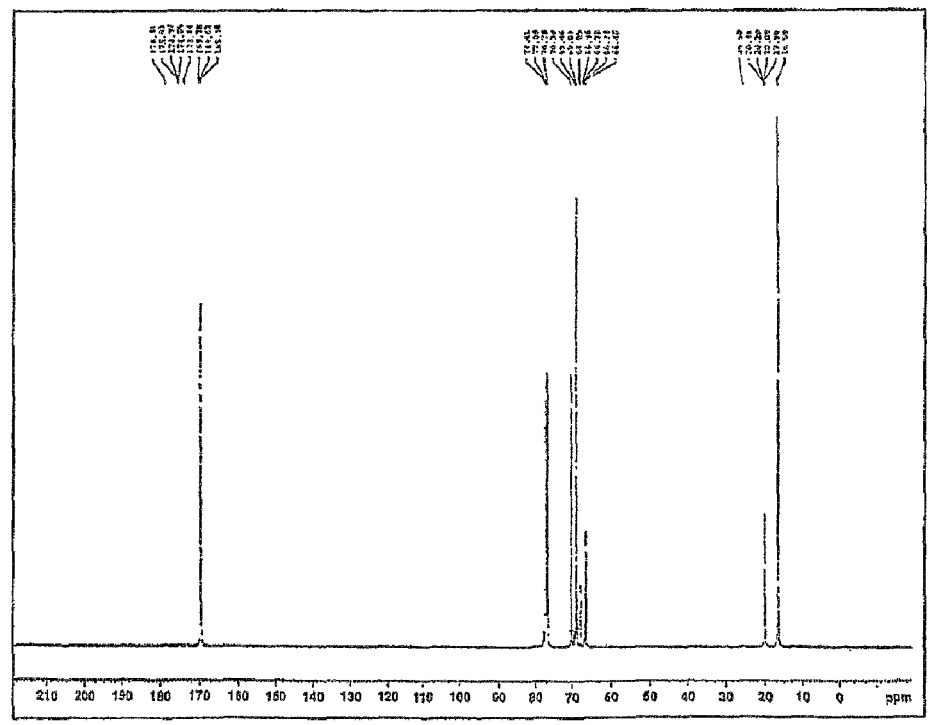
Figure 20B:
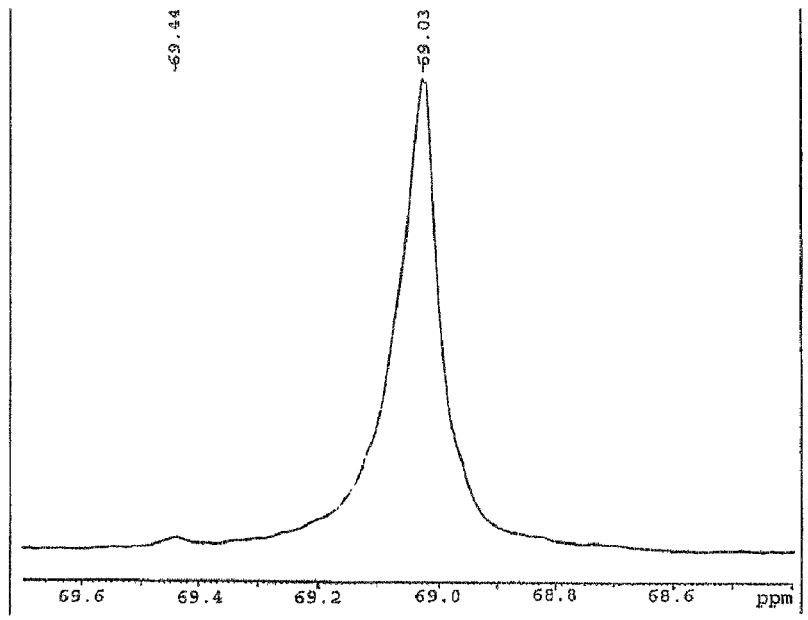
Figure 20C:
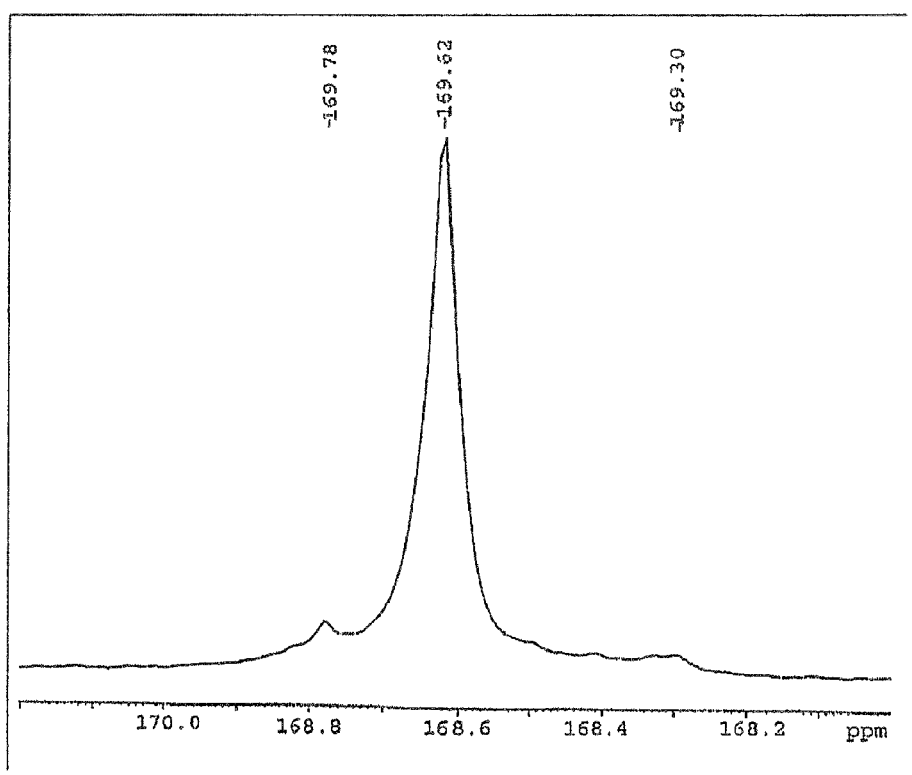
Figure 21A:
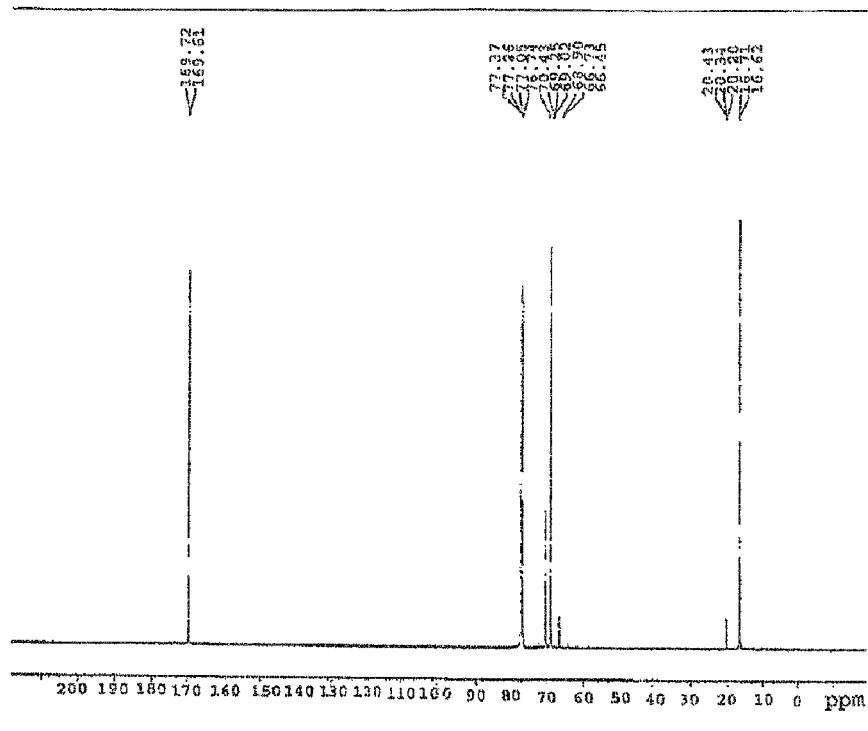
Figure 21B:
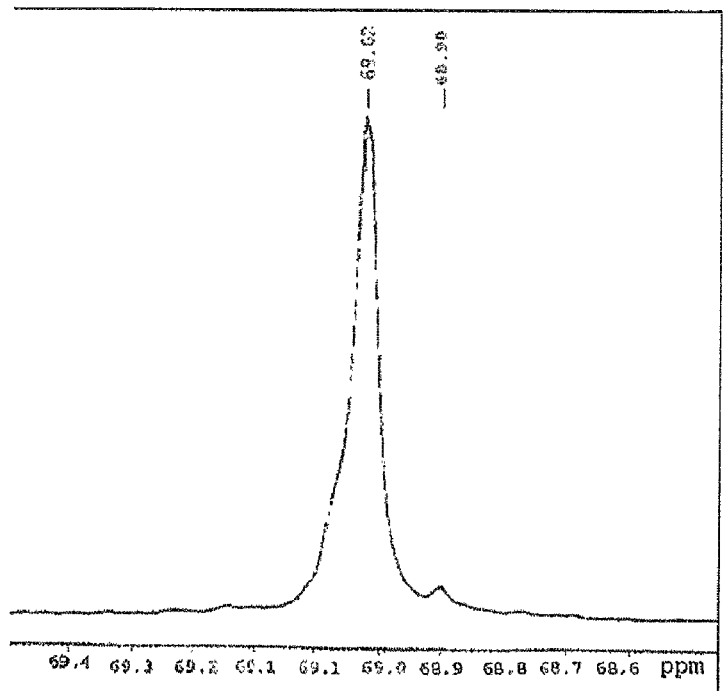
Figure 21C:
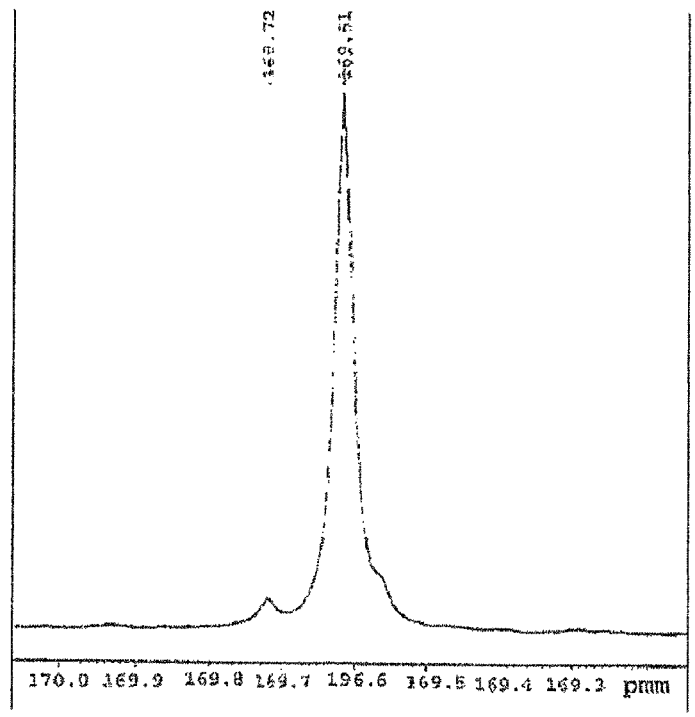
Figure 22A:
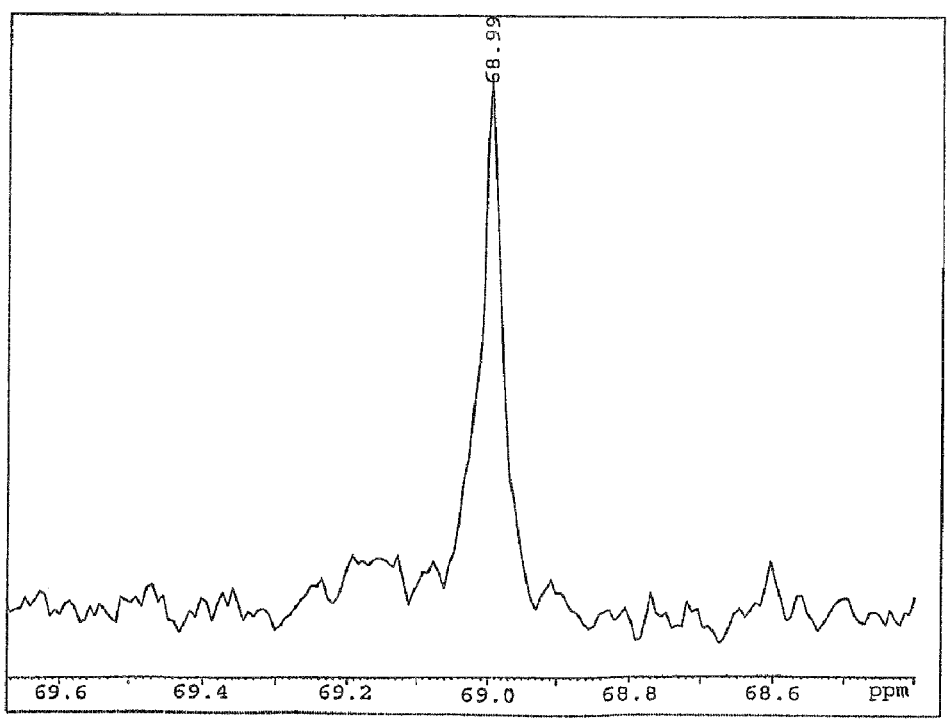
Figure 22B:
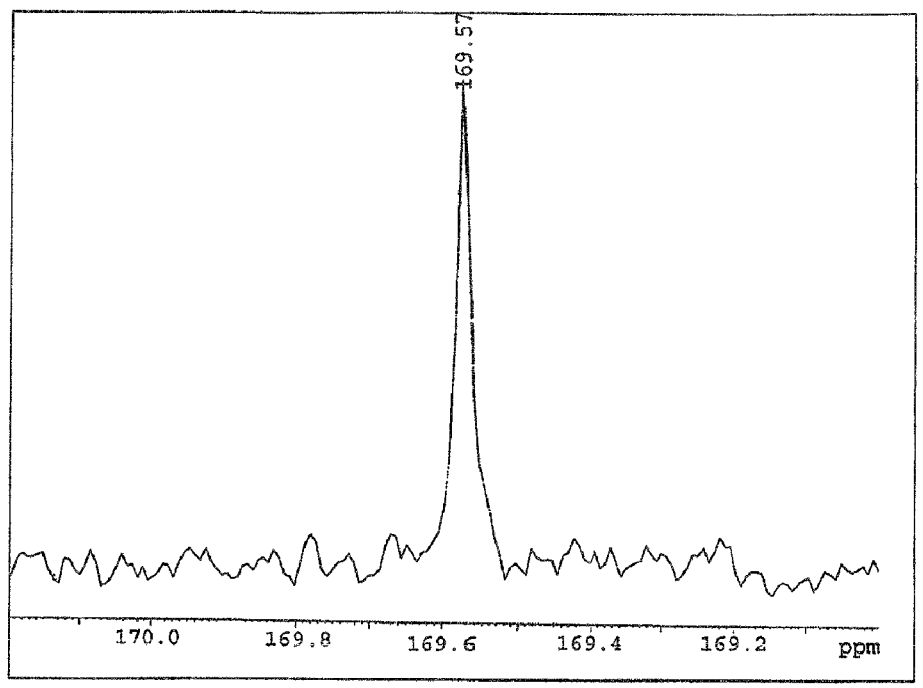

FIG. 16 shows the IR spectrum of the copolymer obtained. It allowed the following characteristic functions of the copolymer to be determined:
 ester functions at 1727 cm$^{-1}$;
 alcohol functions with an absorption maximum located at 3444 cm$^{-1}$;
 C—O bonds at 1220 and 1097 cm$^{-1}$.

The thermograms obtained by DSC showed the presence of a single glass transition temperature.

EXAMPLE 6

Preparation of a PLLA-b-PEG-b-PLLA Copolymer

A PLLA-b-PEG-b-PLLA copolymer was prepared employing the conditions of Example 1, replacing MgH$_2$ by CaH$_2$. It was obtained in a yield of 70% in the form of a precipitate.

The following characteristics were deduced from the GPC chromatogram and the $^1$H-NMR spectrum:

Mn(theoretical)=16400; Mn (NMR)=15600; Mn (GPC)=13200; Ip=1.15.

EXAMPLE 7

Preparation of a PCL-b-PEG-b-PCL Copolymer

A PCL-b-PEG-b-PCL copolymer was prepared employing the conditions of Example 2, replacing $MgH_2$ by $CaH_2$. It was obtained in a yield of 80% in the form of a precipitate.

The following characteristics were deduced from the GPC chromatogram and the $^1$H-NMR spectrum:

Mn(theoretical)=13400; Mn (NMR)=14000; Mn (GPC)=11500; Ip=1.14.

EXAMPLE 8

Preparation of a PBL-b-PEG-b-PBL Copolymer

A PBL-b-PEG-b-PBL copolymer was prepared employing the conditions of Example 3, replacing $MgH_2$ by $CaH_2$, and using 6.9 mmol of β-butyrolactone instead of 13.8 mmol. It was obtained in a yield of 50% in the form of a precipitate.

The following characteristics were deduced from the GPC chromatogram and the $^1$H-NMR spectrum:

Mn(theoretical)=10600; Mn (NMR)= 7500; Mn (*GPC*)=6500; *Ip*=1.25.

EXAMPLE 9

Preparation of a PVA-g-PLLA Copolymer

A PVA-g-PLLA copolymer was prepared employing the operating conditions of Example 4, using a PVA with a Mn of between 13000 and 23000, and the hydride $MgH_2$.

Various samples were prepared. The particular conditions for preparation and the characteristics of the samples are given in Table III below.

TABLE III

| PVA (mmol) | LLA (mmol) | $MgH_2$ (mmol) | DP | DS | DSC Tg (° C.) | Molar yield, % |
|---|---|---|---|---|---|---|
| 11.36 | 25 | 2 | 6.25 | 17.5 | 40 | 60 |
| 11.36 | 34.7 | 2 | 8.7 | 17.5 | 40 | 67 |
| 11.36 | 69 | 2 | 17.5 | 17.5 | 44 | 70 |
| 11.36 | 104 | 2 | 26 | 17.5 | 47 | 70 |
| 11.36 | 138 | 2 | 34.5 | 17.5 | 44 | 80 |
| 11.36 | 208 | 2 | 52 | 17.5 | 50 | 85 |

EXAMPLE 10

Preparation of a PVA-g-PCL Copolymer

A PVA-g-PCL copolymer was prepared employing the operating conditions of Example 5, using a PVA with a Mn of between 13000 and 23000, and the hydride $MgH_2$.

Various samples were prepared. The particular conditions for preparation and the characteristics of the samples are given in Table IV below.

TABLE IV

| PVA (mmol) | εCL (mmol) | $MgH_2$ (mmol) | DP | DS | DSC Tg (° C.) | Molar yield, % |
|---|---|---|---|---|---|---|
| 11.36 | 4.4 | 0.2 | 11 | 17.5 | 40 | 15 |
| 11.36 | 8.8 | 0.2 | 21 | 17.5 | 40 | 25 |
| 11.36 | 13.2 | 0.2 | 33 | 17.5 | 44 | 36 |
| 11.36 | 17.5 | 0.2 | 44 | 17.5 | 47 | 50 |
| 11.36 | 26.3 | 0.2 | 66 | 17.5 | 44 | 50 |
| 11.36 | 35.1 | 0.2 | 88 | 17.5 | 50 | 60 |

EXAMPLE 11

Proof of Stereoregularity of Copolymers of the Invention

Experiments were carried out to show that polymerizing L-lactide in an argon atmosphere starting from macroinitiators (PEG and PVA brought into contact with $CaH_2$ or $MgH_2$) occurs without isomerization.

Operating Procedure

Several experiments were carried out with PEG compounds with molar masses of 2000 and 10000, PVA compounds with mass average molar masses Mw of 13000-23000, 31000-50000 and 146000-186000 and various L-lactide/PEG EO unit ratios and L-lactide/PVA unit ratios resulting in PLLA concatenations with various degrees of polymerization.

400 MHz $^{13}$C-NMR is the only technique which can demonstrate the presence of a single type of concatenation by identifying the CO and CH signals of PLLA. The CO and CH signals of the poly L-lactide chain are located at 169.56 and 69.04 ppm respectively; the signals relating to heterotactic D-L sequences are located at 169.25-169.50 and 69.40 ppm respectively.

Table V summarizes the experiments carried out and shows the Figure numbers for the 400 MHz $^{13}$C-NMR spectra corresponding to each experiment.

Experiments a) and g) were carried out for comparison purposes, employing the operating conditions of the prior art cited above (Rashkov et al, Macromolecules 1996, 29, pp 57-62), hereinafter designated the "Rashkov procedure".

The theoretical molar masses Mn were obtained using the formula:

Mn=Mw+(Mw/44)x*DS*x72x*DP* in which:

Mw=mean molar mass of commercial PVA, i.e. about 18000 (PVA 13000-23000), 35000 (PVA 21000-51000) and 15500 (PVA 146000-186000);

molar mass of monomer unit of PVA=44;

molar mass of lactide monomer unit=72;

DS=degree of substitution;

DP=degree of polymerization.

TABLE V

| LLA/EO | LLA/PVA unit | Experimental conditions | Mean molar mass Mn | Figure no |
|---|---|---|---|---|
| a) 2/$PEG_{2000}$ | | 140° C. 4 days $CaH_2$ under vacuum | 7950 | 17 |
| b) 8.8 $PEG_{10000}$ | | 120° C. 16 h $MgH_2$, argon | 26900 | 18 |

TABLE V-continued

| LLA/EO | LLA/PVA unit | Experimental conditions | Mean molar mass Mn | Figure no |
|---|---|---|---|---|
| c) 2/$PEG_{2000}$ | | 105° C. 12 h $MgH_2$, argon | 9100 | 19 |
| d) 4.6/$PEG_{2000}$ | | 120° C. 16 h $MgH_2$, argon | 15300 | 20 |
| e) 1/$PEG_{2000}$ | | 120° C. 12 h $MgH_2$, argon | 33000 | 21 |
| f) 5/$PEG_{10000}$ | | 120° C. 20 h $MgH_2$, argon | 76000 | 22 |
| | g) 6/$PVA_{18000}$ | 140° C. 4 days $CaH_2$, vacuum | 360000 theoretical | 23 and 24 |
| | h) 6/$PVA_{35000}$ | 120° C. 24 h $MgH_2$, argon | 660000 theoretical | 25 |
| | i) 2.6/$PVA_{155000}$ | 120° C. 48 h $MgH_2$, argon | 1700000 theoretical | 26 |

Results

FIGS. 18 to 22 show the spectra obtained using the process of the invention, the prepolymer used being polyethylene glycol. FIGS. 25 and 26 show the spectra obtained using the process of the invention with the prepolymer used being PVA.

In FIG. 18, the CO and CH signals of the PLLA chain are located at 169.55 and 68.97 ppm respectively.

In FIGS. 19, 20 and 21, the only signals present are located respectively at 169.58 and 68.99 ppm, 169.62 and 69.03 ppm and 169.61 and 69.02 ppm respectively.

In FIG. 22, only the signals at 169.58 and 68.99 ppm appear. The base line of this spectrum is irregular (background noise), which is in good agreement with the high molar mass of the copolymer (Mn=76000). In fact, the solubility of this copolymer in the solvent $CDCl_3$ necessary for preparing the NMR sample was lower and the solution sample obtained was less concentrated.

These spectra thus show the absence of signals relative to heterotactic D-L sequences.

Similarly, FIGS. 25 and 26 did not exhibit any of the characteristic signals of heterotactic sequences.

It should be noted that similar results were obtained using calcium hydride $CaH_2$ instead of magnesium hydride $MgH_2$.

By way of comparison, starting from the spectrum obtained during experiment a) (presented in FIG. 17), the ratio of the areas of the signals allows the number of heterotactic sequences in the copolymers obtained by the Rashkov process to be determined to be 15-20%.

Figure 23:
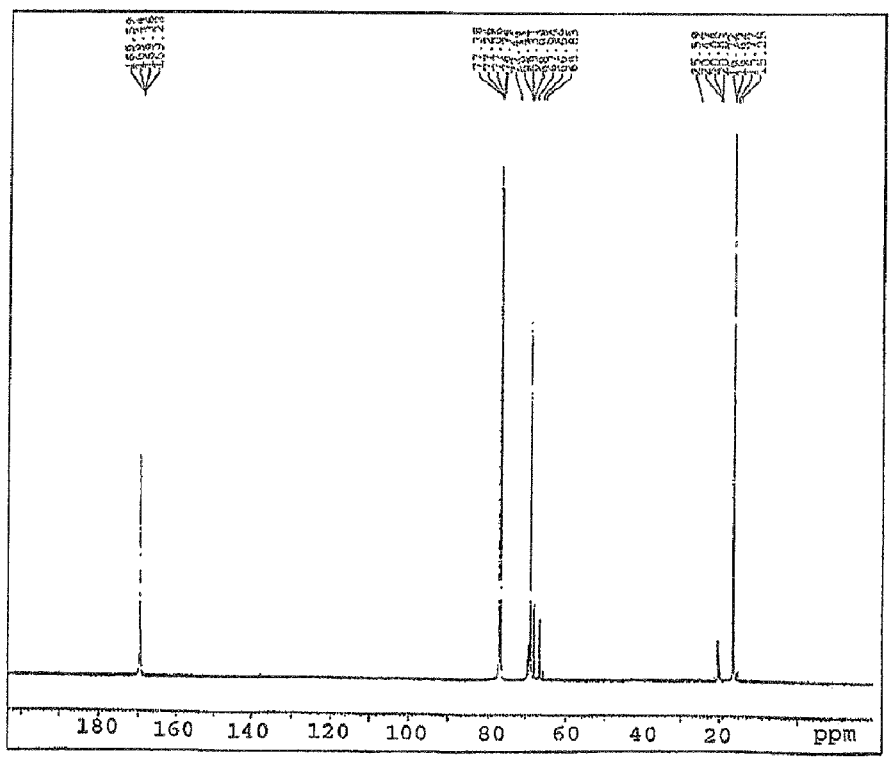
Figure 25A:
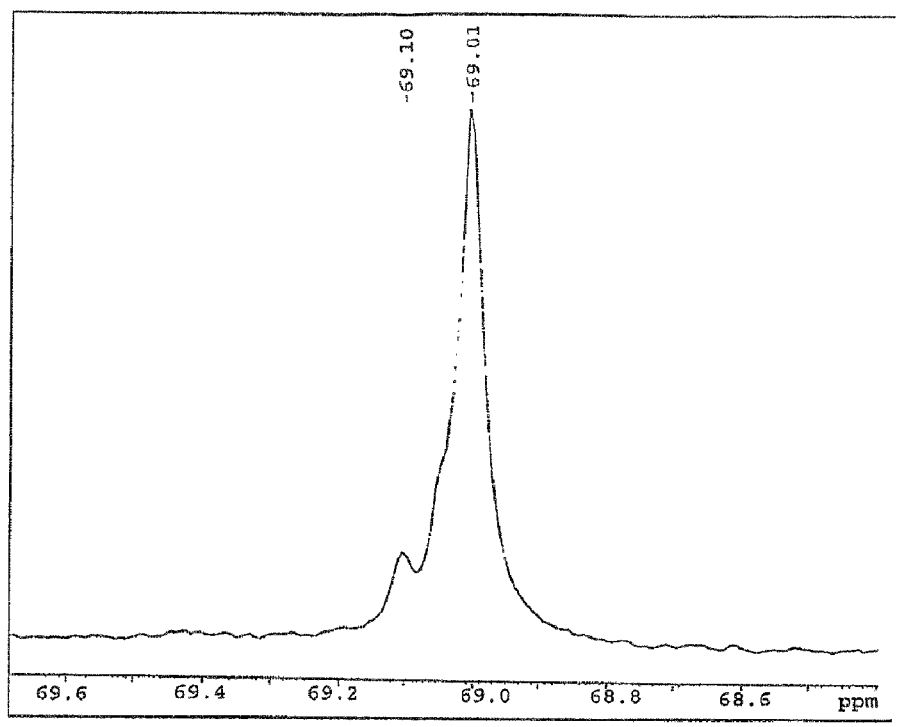
Figure 25B:
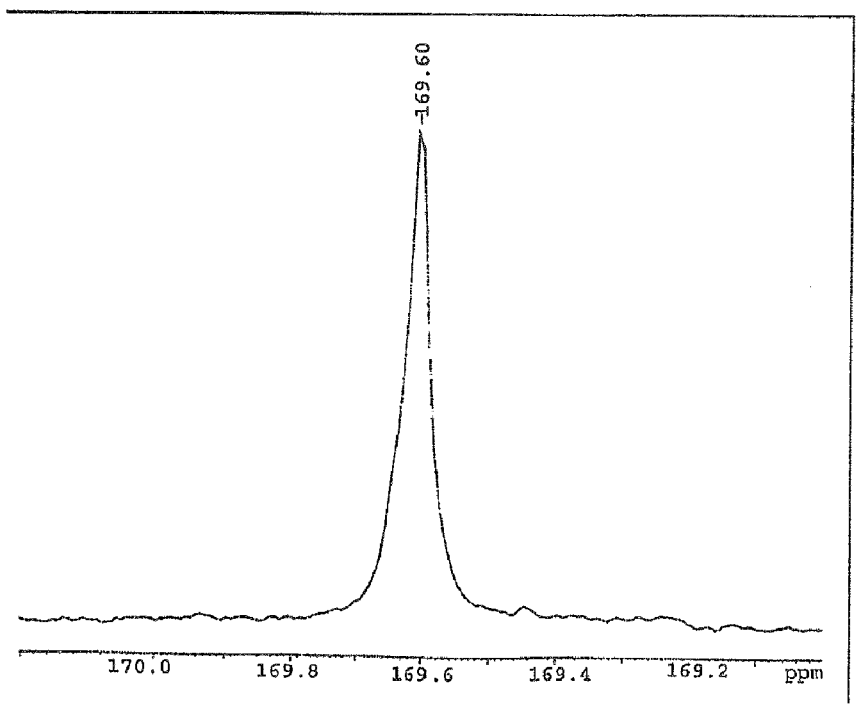
Figure 26A:
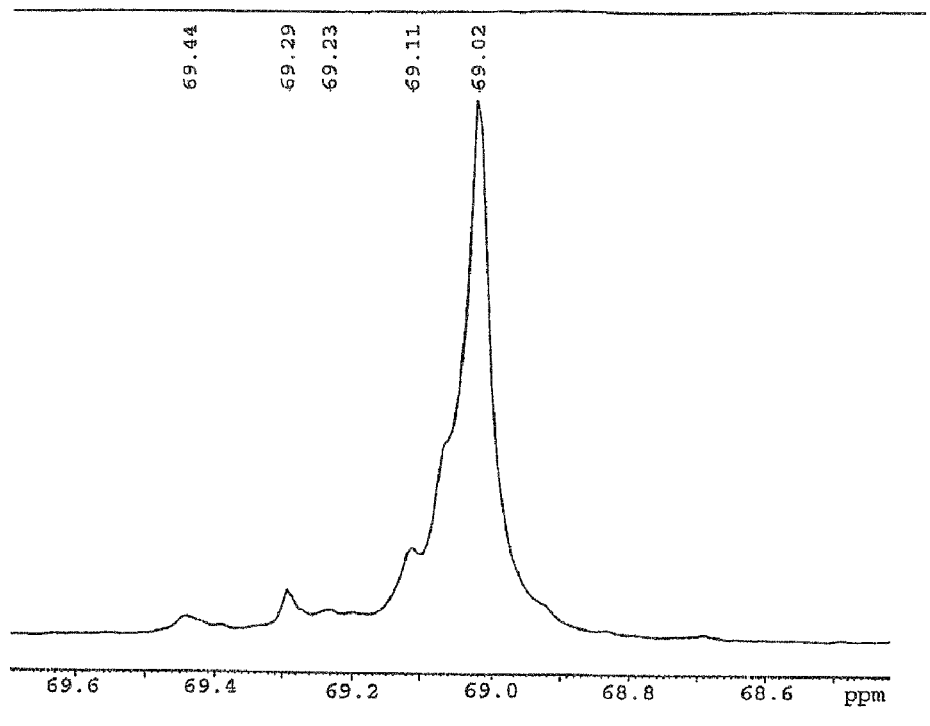
Figure 26B:
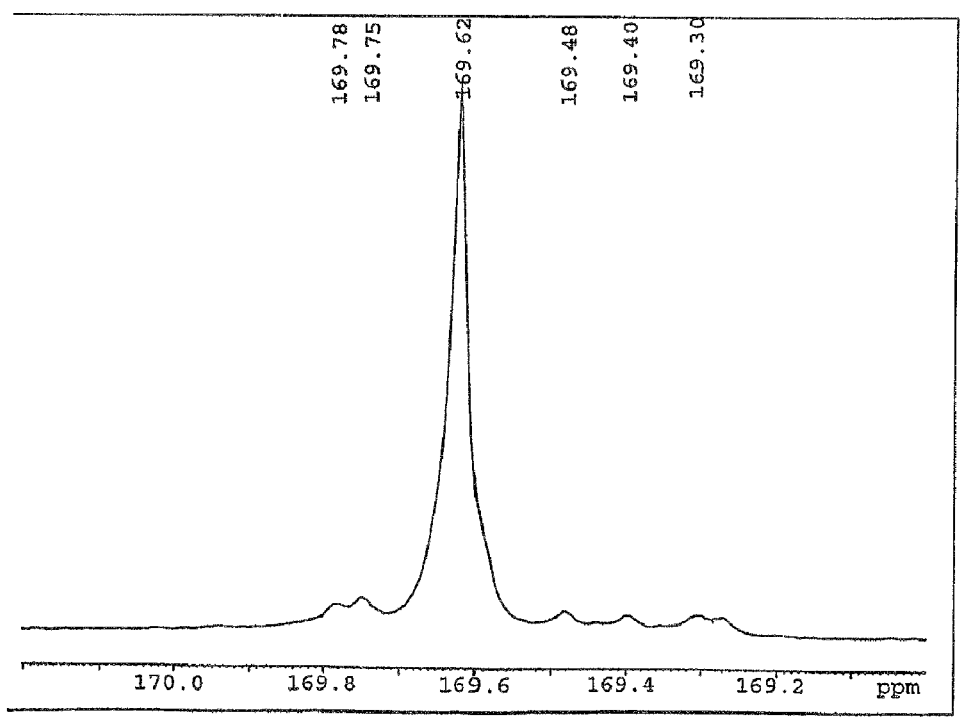
Figure 27A:
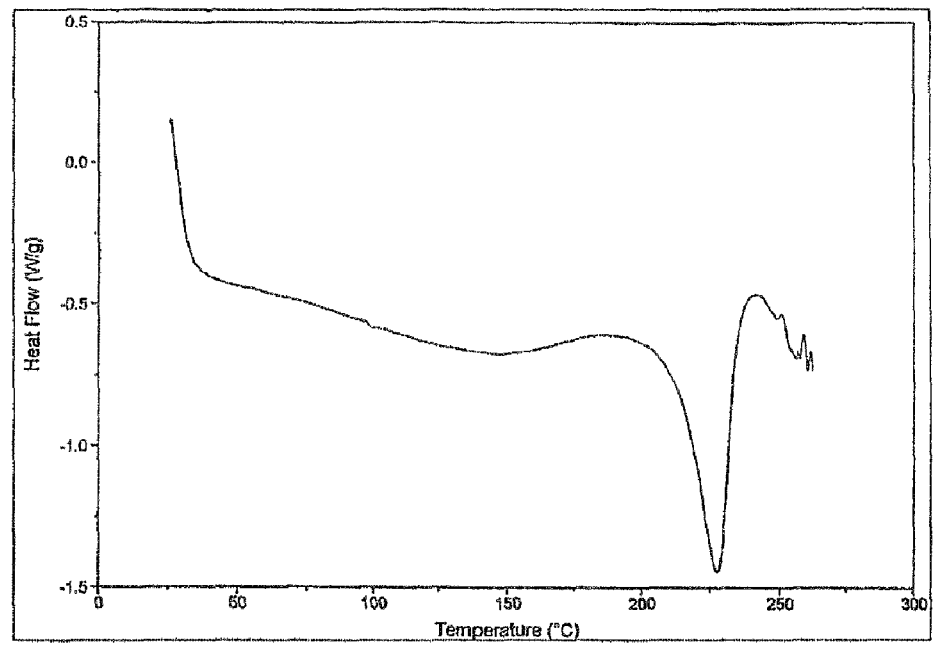
Figure 27B:
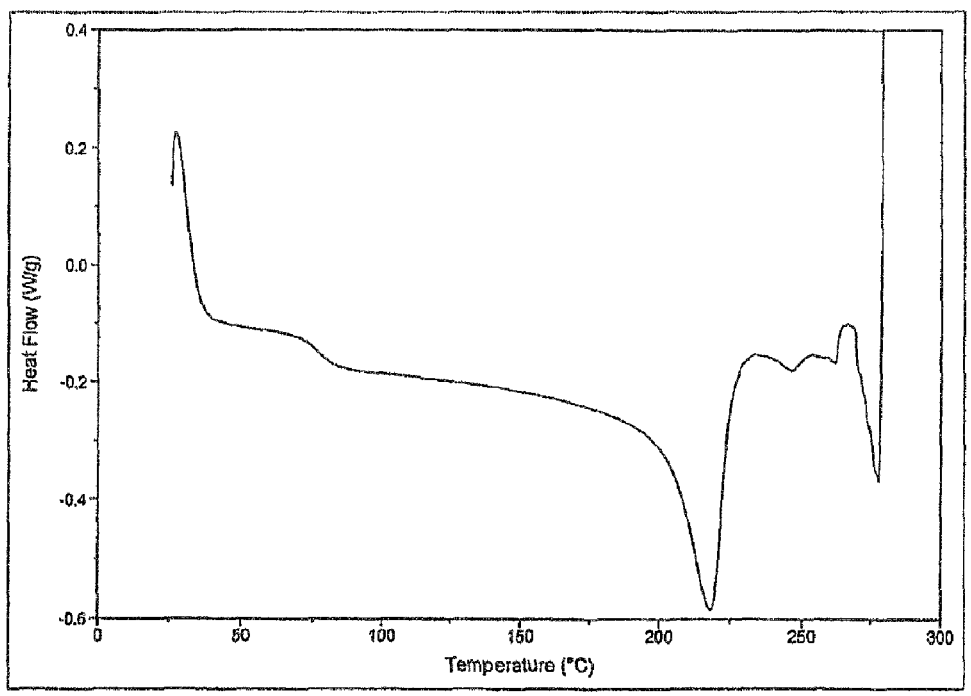
Figure 28A:
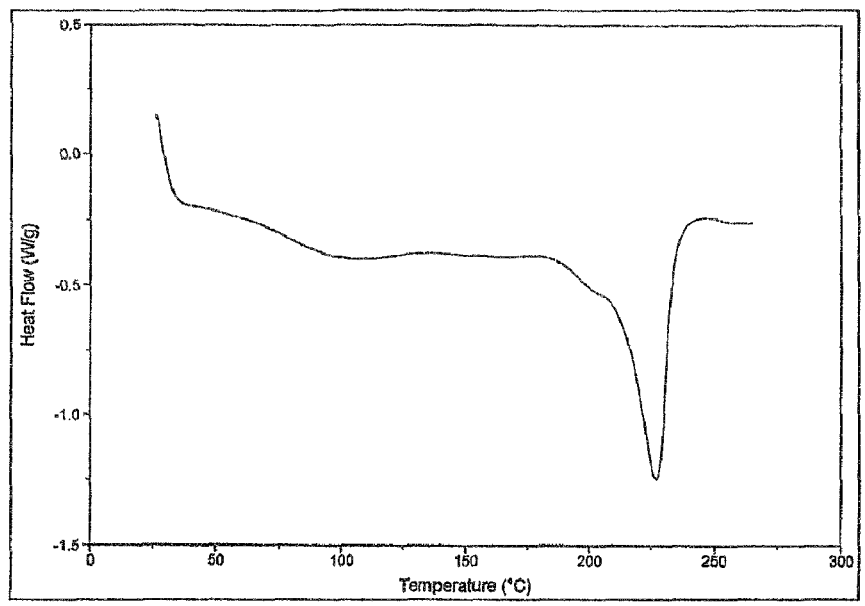
Figure 28B:
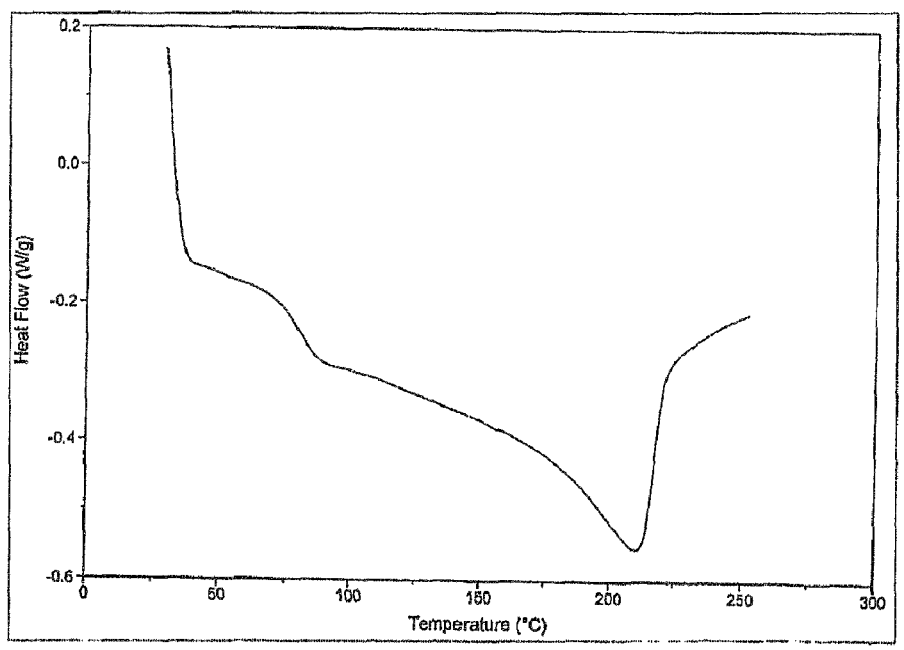
Figure 29A:
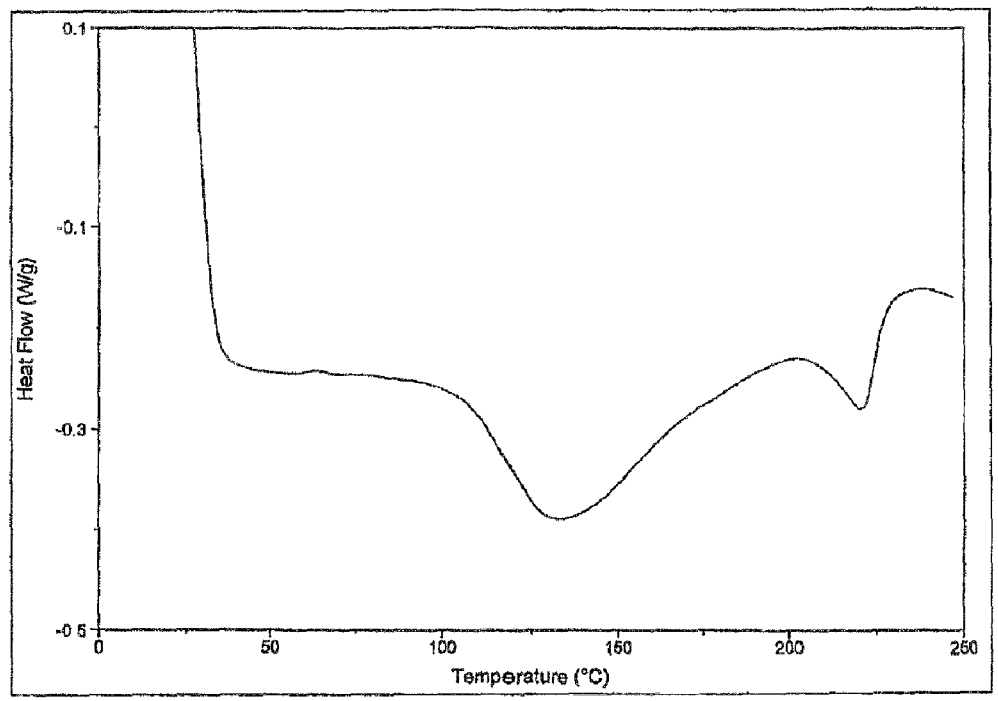
Figure 29B:
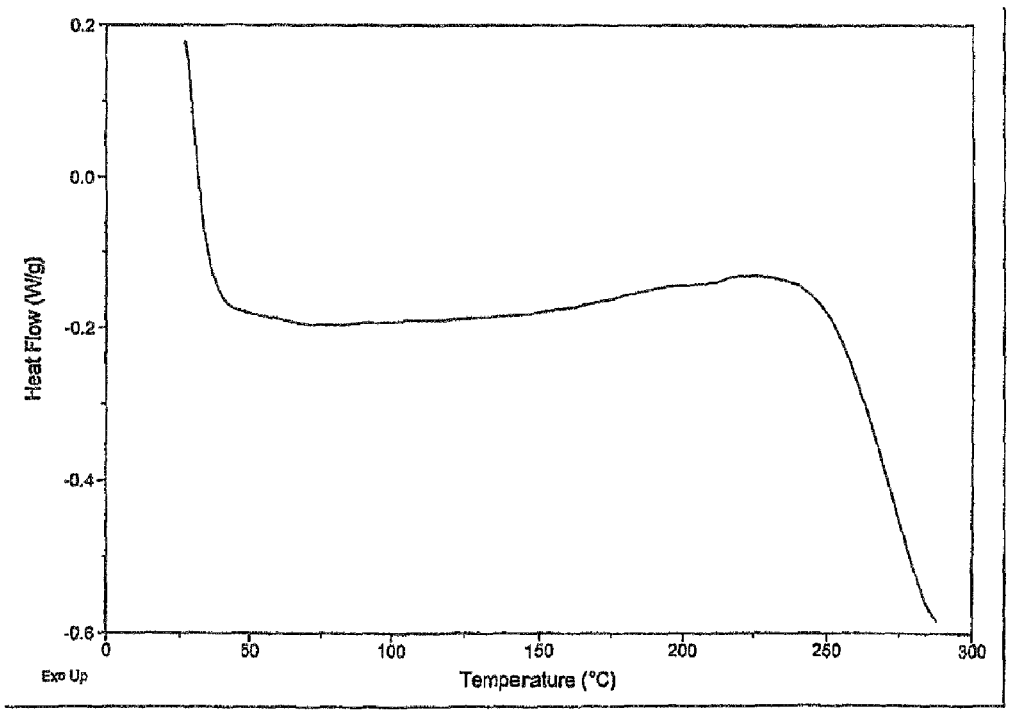

Similarly, in FIGS. 23 and 24, it appears that the signals for the PLLA concatenation were at 175.08 ppm (chain end CO), 169.59 ppm (chain CO), 65.83 (chain end CH), 68.99 (chain CH), 16.62 and 20.03 pm ($CH_3$). The signals for the PVA concatenation were at 67.94 ppm (grafted CH), 66.69 ppm (non grafted CH) and 39 ppm (very low intensity $CH_2$ signal).

The enlarged spectra of FIG. 24 show the signals for the heterotactic sequences at 169.15-169.45 ppm and 69.42 ppm.

It should be noted that the Rashkov process only describes the synthesis of PLLA-PEG-PLLA and it only produced stereoregular concatenations for molar masses of less than 4000 (Macromolecules 1996, 29, page 51, Table 1, FIG. 1). The copolymers with molar masses of more than 4000 and less than 58000 had non-stereoregular D-L sequences (Macromolecules 1996, 29, page 58). The case of molar masses of more than 58000 (Table 1, page 58) was not described.

Conclusion

The stereoregularity of the concatenation of triblock PLLA-b-PEG-b-PLLA and graft PVA-g-PLLA copolymers was observed for a wide range of molar masses.

The milder conditions employed in the process of the invention (lower temperature and shorter polymerization period, argon atmosphere) compared with the Rashkov process are at the origin of this stereoregularity.

EXAMPLE 12

Study of PVA Degradation

Since PVA is highly sensitive to temperature, even minimal degradation results in a brownish colour.

Experiments were carried out to demonstrate that, compared with the process of the invention, PVA degradation is greater when the Rashkov process is carried out. These experiments were also aimed at demonstrating that at a lower temperature, degradation is limited by the presence of monomer and hydride in the reaction medium.

A PVA with a high molar mass, Mw=155000 (high melting point, long chain) was selected for these experiments, in order to encourage chain breaks and modifications to the functional groups. The examples were carried out using the lactide LLA, but the results may be extended to ε-caprolactone and β-butyrolactone.

Reaction Medium

A PVA (2 g, 45 mmol monomer units/LLA (10 g, 138 mmol monomer units) mixture was heated using the following conditions:

either conditions corresponding to the process of the invention: 105° C. for 14 hours in an atmosphere of argon;

or the conditions of the Rashkov process, identical to those used with PEG in the publication cited above: 140° C. for 4 days under vacuum.

In both cases, the PVA is then recovered, separated from the LLA and characterized.

It should be noted that hydride was not incorporated into the mixture, as the aim was not to prepare the copolymer but to compare the influence of the operating conditions on the reaction and the structure of the PVA. The degradation which the PVA chain underwent would affect the PVA concatenation in the PVA-g-PLLA copolymer in a similar manner.

Recovery of PVA after 14 Hours (PVA 14 h) and after 4 Days (PVA 4 Days)

The unrefined solid obtained was slightly yellow in colour after 14 hours (PVA 14 h) and strongly brown coloured after 4 days (PVA 4 days). The unrefined solid was extracted 3 times from boiling chloroform to eliminate the L-lactide which is soluble in chloroform. Small quantities of poly L-lactide could form by polycondensation. This homopolymer is soluble in chloroform and would also be eliminated.

After extracting, the solid was dried and weighed. A mass of PVA of slightly less than 2 g was recovered in each case.

Characterization of Dilute Solutions by Viscosimetry

This method allowed the viscosimetric mean molar mass Mv to be determined by measuring the time of flow of a dilute solution of polymer in a capillary. The Hubbelhode viscosimetric tube was used.

The reduced viscosity $\eta_{red}$ was determined from the flow times using the formula:

$$\eta_{red} = t - t_0/t_0 C$$

in which:
t_0=flow time of water;
t=flow time of polymer solution;
C=concentration.

The intrinsic viscosity ($\eta$) was determined from the Huggins relationship:

$$\eta_{red} = [\eta] + k[\eta]^2 C$$

where k=Huggins constant.

For aqueous solutions of PVA, it is generally considered that $\eta_{red}$ varies little with concentration. Thus, $\eta_{red}$ and $[\eta]$ may be considered to be identical.

The viscosimetric mass is then deduced from the Mark-Houwink relationship:

$$[\eta] = KM_v^a$$

in which the Mark-Houwink constants were $K=2 \times 10^{-2}$ CGS units and a=0.76 at 25° C.

Table VI summarizes the results obtained and shows a comparison with the characteristics of two commercial PVA compounds with respective molar masses of 155000 g/mol and 35000 g/mol, which had not been heated.

The flow time $t_0$ of water, the reference solvent, was 83.9 seconds.

TABLE VI

|  | PVA 155000 | PVA 35000 | PVA 14 h | PVA 4 days |
|---|---|---|---|---|
| Concentration | 0.5 g/100 ml | 0.5 g/100 ml | 0.5 g/100 ml | Insoluble |
| Flow time (s) | 136.1 ± 0.2 | 102.6 ± 0.2 | 129.3 ± 0.2 | — |
| Intrinsic viscosity [$\eta$], (ml/g) | 96.75 | 40.24 | 86.50 | — |
| Molar mass Mv | 67000 | 21000 | 62000 | — |

The PVA 4 days was insoluble in water; its molar mass could not be determined. This insolubility may be associated with profound changes in the structure of PVA heated to 140° C., in particular cross-linking of the chains.

The values of Mv obtained were different to the values Mw of the commercial PVA. This difference is normal, since different methods are used for determining the masses. The ratio between Mv and Mw was retained, however.

Characterization by Differential Scanning Calorimetry, DSC

This analysis was carried out on PVA 14h, PVA 4 days, but also on commercial PVA and on PVA/LLA and PVA/LLA/MgH$_2$ mixtures which had not been heated. The glass transition temperature Tg and melting point Tf recorded after two temperature rise stages at 10° C./min are shown in Table VII. This table also indicates the numbers of the figures corresponding to each experiment.

TABLE VII

| T, ° C. | PVA | PVA, 14 h | PVA, 4 days | PVA + LL mixture | PVA + LLA + MgH$_2$ mixture |
|---|---|---|---|---|---|
| Tg-1$^{st}$ increase | — | 75 | 135 | — | — |
| Tg-2$^{nd}$ increase | 75 | | | — | — |
| Tf-1$^{st}$ increase | 228 | 210 | 222 | Only 1 increase | Only 1 increase |
| Tf-2$^{nd}$ increase | 220 | 228 | Decomposition | 100(LLA) 202 (PVA) | 100 (LLA) 225 (PVA) peak <110° C. |
| Figure no | 27a and 27b | 28a and 28b | 29a and 29b | 30a | 30b |

The thermograms for PVA and PVA 14 h (FIGS. 27a, b and 28a, b) were comparable, which means that the thermal properties of PVA are retained even after 14 hours at 105° C. In contrast, major modifications to the thermal properties occurred in the case of PVA 4 days (FIG. 29a, b): large increase in Tg (1$^{st}$ increase), absence of melting and decomposition of polymer from 250° C. (2$^{nd}$ increase). The indices a and b of FIGS. 27, 28 and 29 correspond respectively to the first and second increase.

Figure 30A:
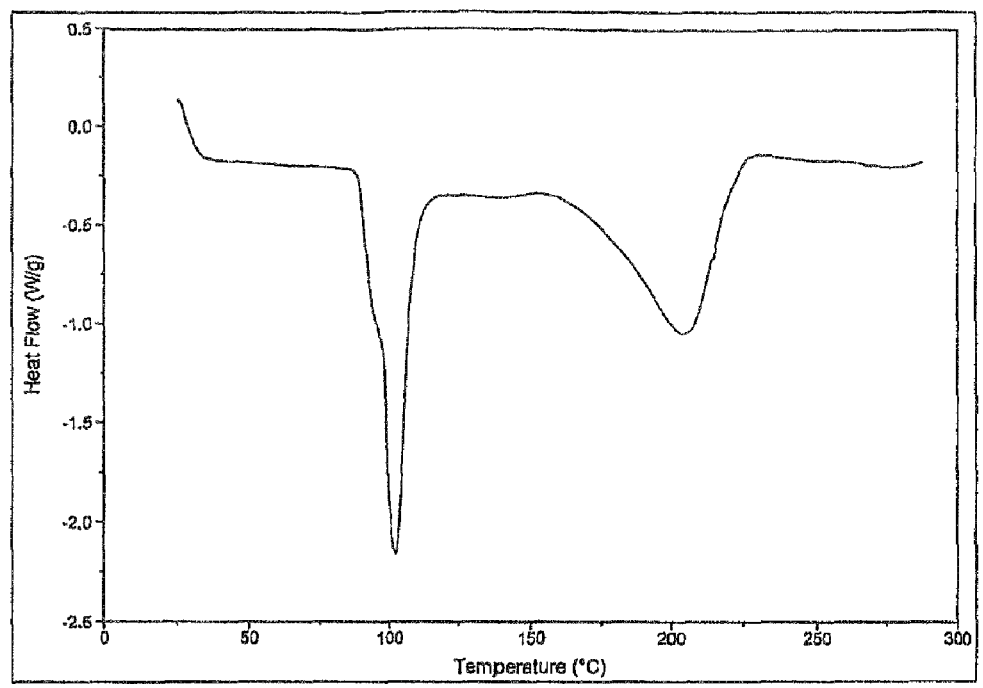

The thermogram of FIG. 30a was carried out after mixing finely ground PVA (10 mg, 0.22 mmol) and LLA (60 mg, 1.1 mmol). The melting zone of the polymer in the mixture commenced at 150° C., with a maximum value at 202° C., lower than that for PVA (Tf=228° C., 1$^{st}$ increase). It can be concluded therefrom that adding LLA to PVA reduces the melting point of the polymer by about 50° C.

Figure 30B:
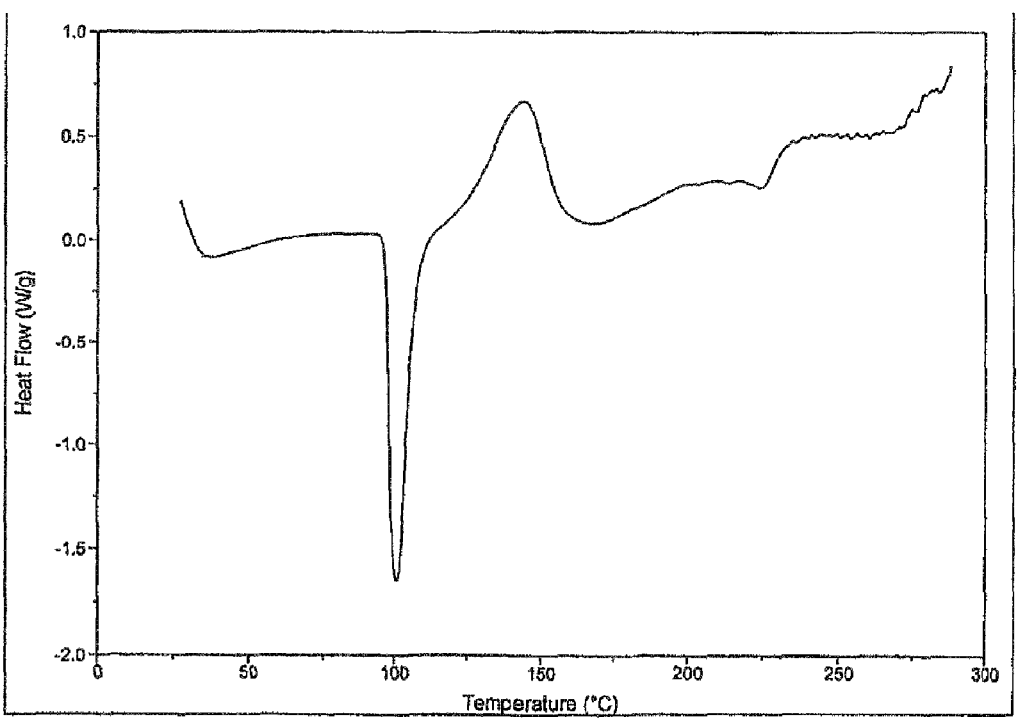
Figure 31A:
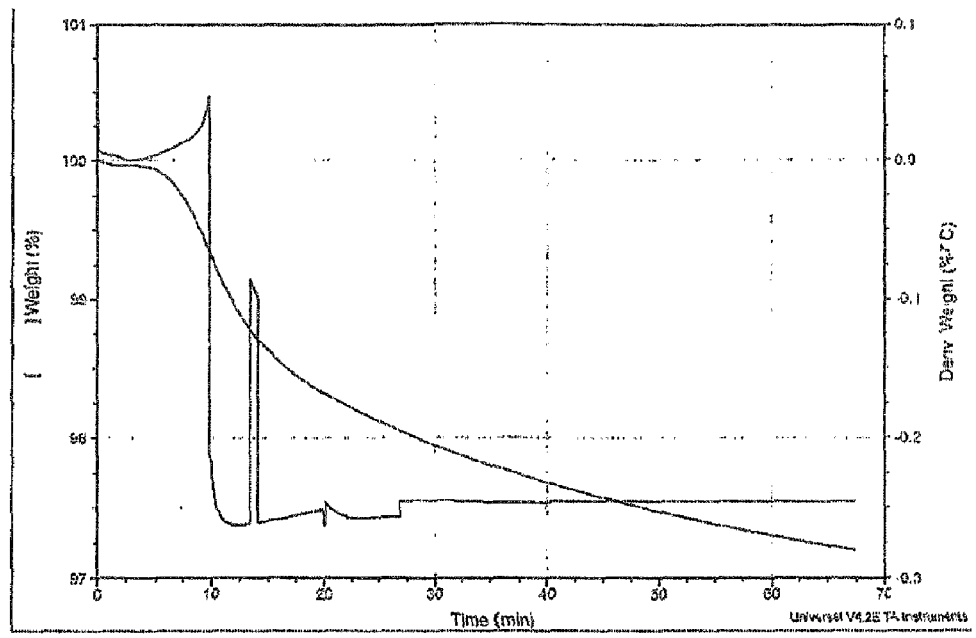
Figure 31B:
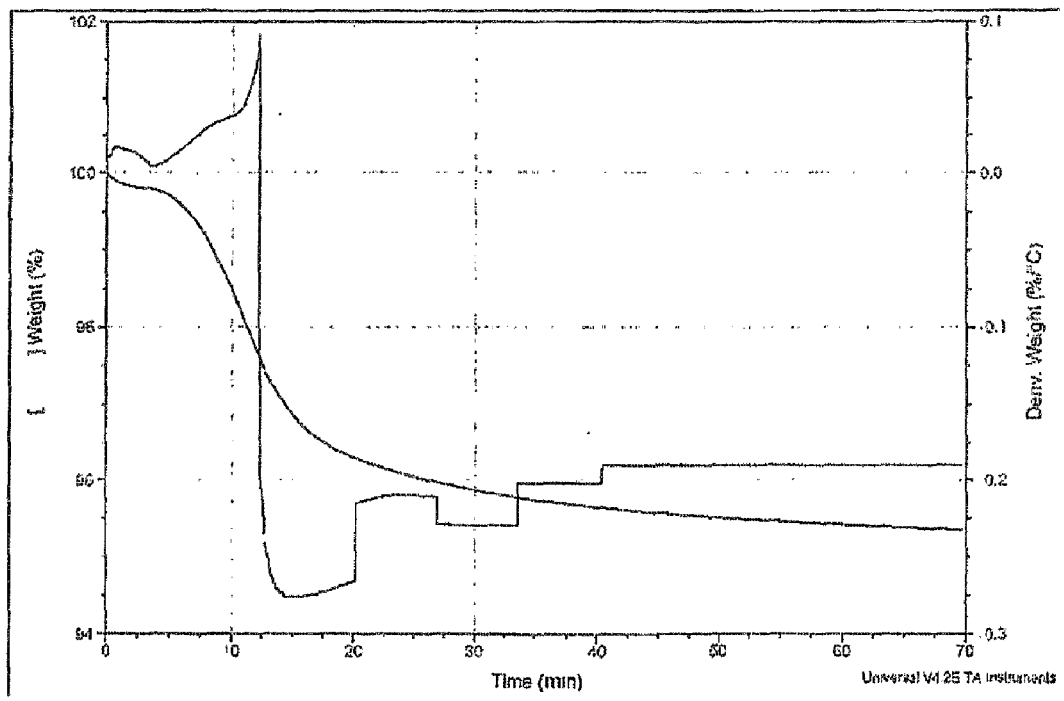

The thermogram of FIG. 30b was produced after adding MgH$_2$ to the preceding PVA/LLA mixture. Note the appearance of an exothermic peak from 105° C., which corresponded to initiation of the copolymerization reaction.

The area of the endothermic peak corresponding to melting of PVA was reduced and provided evidence for the disappearance of the PVA.

It is important to note that the copolymerization reaction commenced at a temperature which was substantially lower than the melting point of PVA.

Characterization by Thermogravimetric Analysis, TGA

This analysis was carried out on PVA, PVA 14 h, PVA 4 days and on PVA at a constant temperature of 105° C. and 140° C. The thermograms for PVA at a constant temperature of 105° C. and 140° C. were recorded for 60 minutes in nitrogen. The polymer had been carefully ground and dried under vacuum at ambient temperature for 4 hours to prevent any possible loss of residual water in the polymer.

Table VIII summarizes the results obtained and indicates the Figure numbers corresponding to each experiment.

TABLE VIII

| T, ° C. | Isotherm, PVA, 105° C. | Isotherm, PVA, 140° C. | PVA | PVA 14 h | PVA 4 days |
|---|---|---|---|---|---|
| Td, onset | | | 100 | 100 | 80 |
| Td 5% | | | 220 | 220 | 115 |
| Td max | | | 280 | 280 | 225 |
| % loss | 2.6 | 4.5 | | | |
| Figure no | 31a | 31b | 32a | 32b | 32c |

The thermograms show that the percentage loss of weight was greater at 140° C. (4.5%) than at 105° C. (2.6%) (Table VIII and FIGS. 31a, b).

Figure 32A:
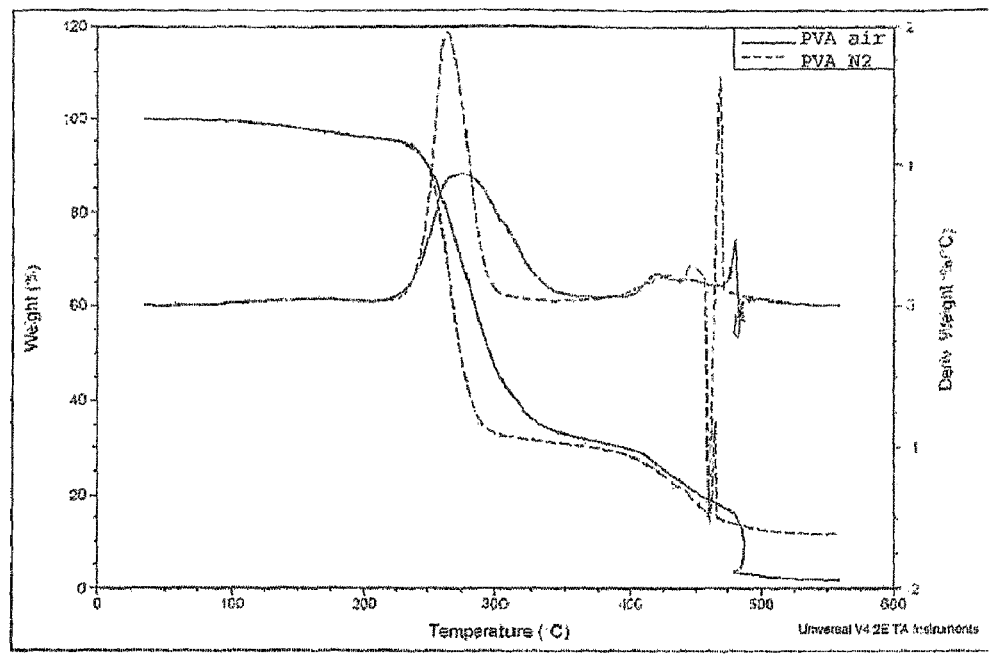
Figure 32B:
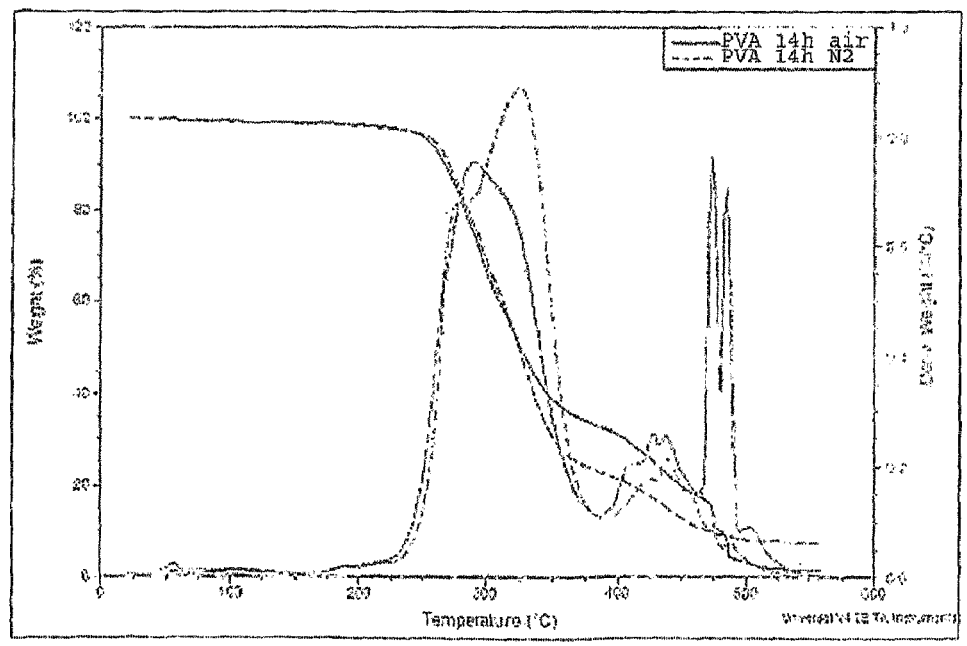
Figure 32C:
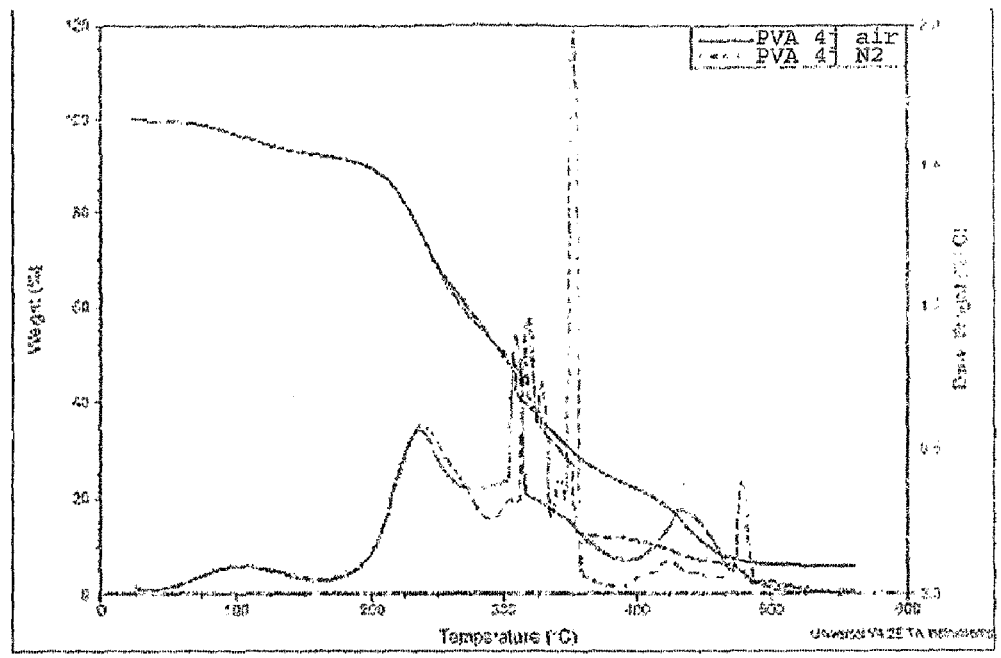

The thermograms for PVA and PVA 14 h in air and in nitrogen were similar (FIGS. 32a, b) and substantially different from the thermogram for PVA 4 day. The degradation onset temperature (Td) reduced from 100° C. to 80° C.; the temperature corresponding to the loss of 5% by weight (Td 5%) reduced more, from 220° C. to 115° C. The temperature corresponding to the maximum rate of loss also reduced, from 280° C. to 225° C. (FIG. 32c).

Characterization by UV-Visible Analysis

UV-vis spectrophotometry of powders of polymers (FIG. 33) showed that PVA absorbed in a narrow zone with a wavelength at about 300 nm, while PVA 14 h . . . had a more extended zone, from 200 nm to 400 nm. The shift in the absorption zone was in agreement with the pale yellow coloration of the solid.

The absorption of PVA 4 days was much more intense and provided evidence of a major modification in the structure of the PVA. It extended from 200 nm to 700 nm and can be attributed to highly conjugated unsaturated functional groups obtained by thermal and chemical modification of the hydroxyl groups of PVA.

Characterization by IR-ATR Analysis

IR spectroscopy in total attenuated reflection (TAR) mode in the powder form allowed an analysis up to a depth of 2 to 5 μm. The spectrum of PVA (FIG. 34a) had characteristic $v_{O-H}$ bands from 3050 to 3450 cm$^{-1}$ and $v_{C-C}$ and $v_{C-O}$ bands from 100 to 1300 cm$^{-1}$.

The PVA 14h (FIG. 34b) had a similar spectrum; however the appearance of low intensity bands in the region 750-900 cm$^{-1}$ should be noted.

Figure 35B:
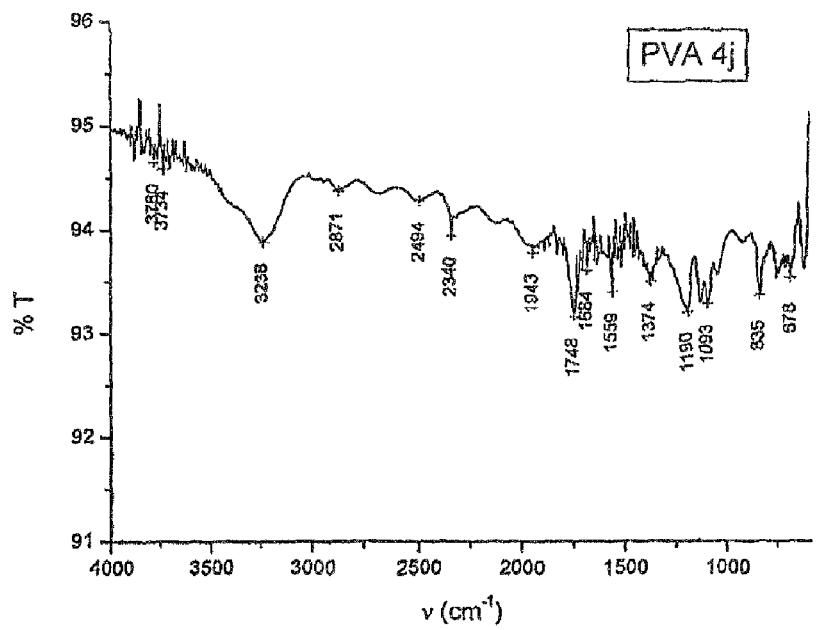
Figure 35B:
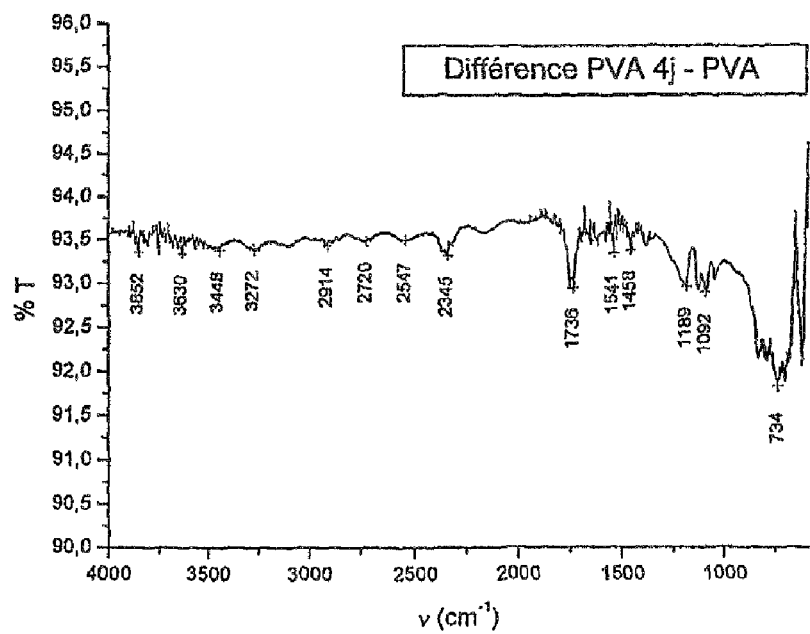

These bands were much more intense in the spectrum of PVA 4 day (FIG. 35a). They are much clearer in FIG. 35b which shows only the bands relating to the functional groups introduced following heating at 140° C. for 4 days (difference, PVA 4 days–PVA). These bands are attributed to deformations of the C—H bonds in the unsaturated carbon-containing, aromatic or highly conjugated structures resulting from cross linking of the PVA chains.

Conclusion

1. PVA

The degradation of PVA is much greater at 140° C. than at 105° C. The difference is visible even after heating for one hour (DSC).

2. PVA-LLA

The presence of LLA reduces the melting point of PVA by about 50° C. (DSC).

Without MgH$_2$, the hydroxyl functions of PVA do not react and the polymer is not consumed. Its degradation is much greater at 140° C. over 4 days under vacuum than at 105° C. for 14 hours in argon (according to the following parameters: colour, solubility, Mv, DSC, ATG, IR and UV).

In the presence of MgH$_2$ at about 105° C., PVA swells then dissolves in the molten LLA. Thus, it no longer exists in the solid form (DSC). PVA reacts with MgH$_2$ to form the magnesium alcoholate type macroinitiator in solution in the LLA, in accordance with the reaction below. The copolymerization reaction initiates as soon as the first alcoholate functions appear at about 105° C. LLA is consumed and PLLA is grafted onto PVA. In theory, it is thus not necessary to heat beyond this temperature.

2 ——PVA—CH$_2$—CH(OH)——PVA—— + MgH$_2$

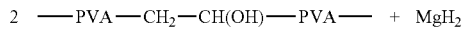

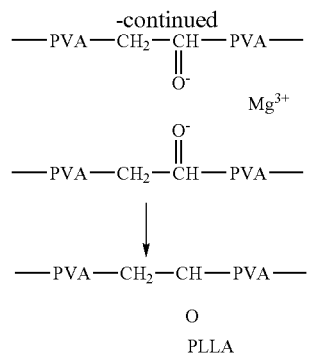

Comparison with Rashkov Process

The PEG —(CH$_2$—CH$_2$—O)— used in the Rashkov process and the PVA —(CH$_2$—CH(OH))) used in the experiments described above have very different structures and behaviour. PEG is dihydroxylated while PVA 155000, for example, has 155000/44=3522 hydroxyl groups in the concatenation.

Cohesion of PVA molecules in the solid state is due to a large number of hydrogen interactions; it is much higher than for PEG. The melting point is also higher for PVA: Tf$_{PVA}$=225° C. and Tf$_{PEG}$=60° C.

The degradation of hydroxylated polymers is in large part due to dehydroxylation reactions leading to unsaturated bonds. As a result, the sensitivity of PVA to thermal degradation is much greater than that of PEG.

Further, PEG melts at a temperature below that of LLA (Tf=96° C.), which renders preparing the reaction medium easier and runs no risk of degradation.

The invention claimed is:

1. A process for preparing a block or comb copolymer comprising at least one hydrophilic portion and at least two hydrophobic portions, said process comprising:
   polymerizing a prepolymer selected from the group consisting of a polyethylene glycol and a polyvinyl alcohol, and a lactone monomer or a dilactone monomer by anionic solvent-free polymerization,
   wherein said anionic solvent-free polymerization is carried out in the presence of an alkaline-earth metal hydride and in an inert atmosphere, with the proviso that the polymerization step is not carried out under vacuum.

2. The process according to claim 1, wherein said alkaline-earth metal hydride is selected from the group consisting of calcium hydride CaH$_2$ and magnesium hydride MgH$_2$.

3. The process according to claim 1, wherein said lactone monomer or dilactone monomer is selected from the group consisting of L-lactide, glycolide, β-butyrolactone, δ-valerolactone and ε-caprolactone.

4. The process according to claim 1, wherein said inert atmosphere is an argon atmosphere or is a nitrogen atmosphere.

5. The process according to claim 1, wherein the prepolymer is polyethylene glycol, and the polymerization is carried out at a temperature of 115° C. to 125° C. for a period of 14 to 16 hours.

6. The process according to claim 1, wherein the prepolymer is polyvinyl alcohol, and the polymerization is carried out at a temperature of 140° C. to 150° C. for a period of 36 to 54 hours.

* * * * *